United States Patent
Yoshino et al.

(10) Patent No.: US 6,744,484 B1
(45) Date of Patent: Jun. 1, 2004

(54) LCD HAVING DUMMY ELECTRODES OR LIGHT-CUTTING FILM WITH CURRENT LEAKAGE PREVENTING SLITS

(75) Inventors: Takeru Yoshino, Tanashi (JP); Terutaka Okano, Tanashi (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/380,781

(22) PCT Filed: Jan. 8, 1999

(86) PCT No.: PCT/JP99/00043

§ 371 (c)(1),
(2), (4) Date: Sep. 9, 1999

(87) PCT Pub. No.: WO99/35532

PCT Pub. Date: Jul. 15, 1999

(30) Foreign Application Priority Data

Jan. 9, 1998 (JP) .......................... 10-002827
Oct. 2, 1998 (JP) .......................... 10-280748

(51) Int. Cl.[7] ............................................ G02F 1/1343
(52) U.S. Cl. .................... 349/153; 349/111; 349/149
(58) Field of Search ............................... 349/111, 149, 349/153

(56) References Cited

U.S. PATENT DOCUMENTS

| | | | |
|---|---|---|---|
| 5,128,786 A | * 7/1992 | Yanagisawa | 359/67 |
| 5,323,252 A | 6/1994 | Yoshida et al. | 359/54 |
| 5,619,358 A | 4/1997 | Tanaka et al. | 349/143 |
| 5,838,411 A | 11/1998 | Hayakawa et al. | 349/139 |
| 5,905,558 A | 5/1999 | Tokunaga et al. | 349/149 |
| 6,198,519 B1 | * 3/2001 | Chang | 349/129 |
| 6,268,895 B1 | * 7/2001 | Shimada et al. | 349/110 |

FOREIGN PATENT DOCUMENTS

| | | |
|---|---|---|
| JP | 62049323 | 3/1987 |
| JP | 01105248 | 4/1989 |

(List continued on next page.)

OTHER PUBLICATIONS

Intl. Search Report dated Mar. 23, 1999 by Japanese Patent Office for PCT/JP99/00043.

Primary Examiner—Tarifur R. Chaudhury
Assistant Examiner—Andrew Schechter
(74) Attorney, Agent, or Firm—Finnegan, Henderson, Farabow, Garrett & Dunner, L.L.P.

(57) ABSTRACT

A liquid crystal apparatus with leak current preventing function includes first and second transparent substrates provided opposite to each other; first and second drive electrodes for an image, each formed on an opposite inner surface of the first and second transparent substrates; a sealing member (56) provided between the first and second transparent substrates for providing a liquid crystal injecting area and forming a gap in order to seal the liquid crystal therebetween; a plurality of conductive particles included dispersedly within the sealing member (56); a non-pixel electrode formed on position covered by the sealing member between the first and second transparent substrates; a dummy electrode (40D) formed opposite to the non-pixel electrode at the position in which the first and second transparent substrates are covered by the sealing member; and a conductive light-cutting film provided to at least one of inner surface of the first and second transparent substrates for cutting off unnecessary light at a display area and peripheral area thereof; wherein the dummy electrode (40D) is divided by a plurality of slits, and further, a separation slit is provided at the position at which the light-cutting film is superposed on at least sealing member and peripheral portion, to divide the light-cutting film into a plurality of portions.

21 Claims, 18 Drawing Sheets

FOREIGN PATENT DOCUMENTS

| | | |
|---|---|---|
| JP | 02/234122 | 9/1990 |
| JP | 03-12635 A | 1/1991 |
| JP | 04242719 | 8/1992 |
| JP | 04/271326 | 9/1992 |
| JP | 06-51332 A | 2/1994 |
| JP | 8/211398 | 8/1996 |
| JP | 9-61837 | 3/1997 |
| JP | 09/080414 | 3/1997 |

\* cited by examiner

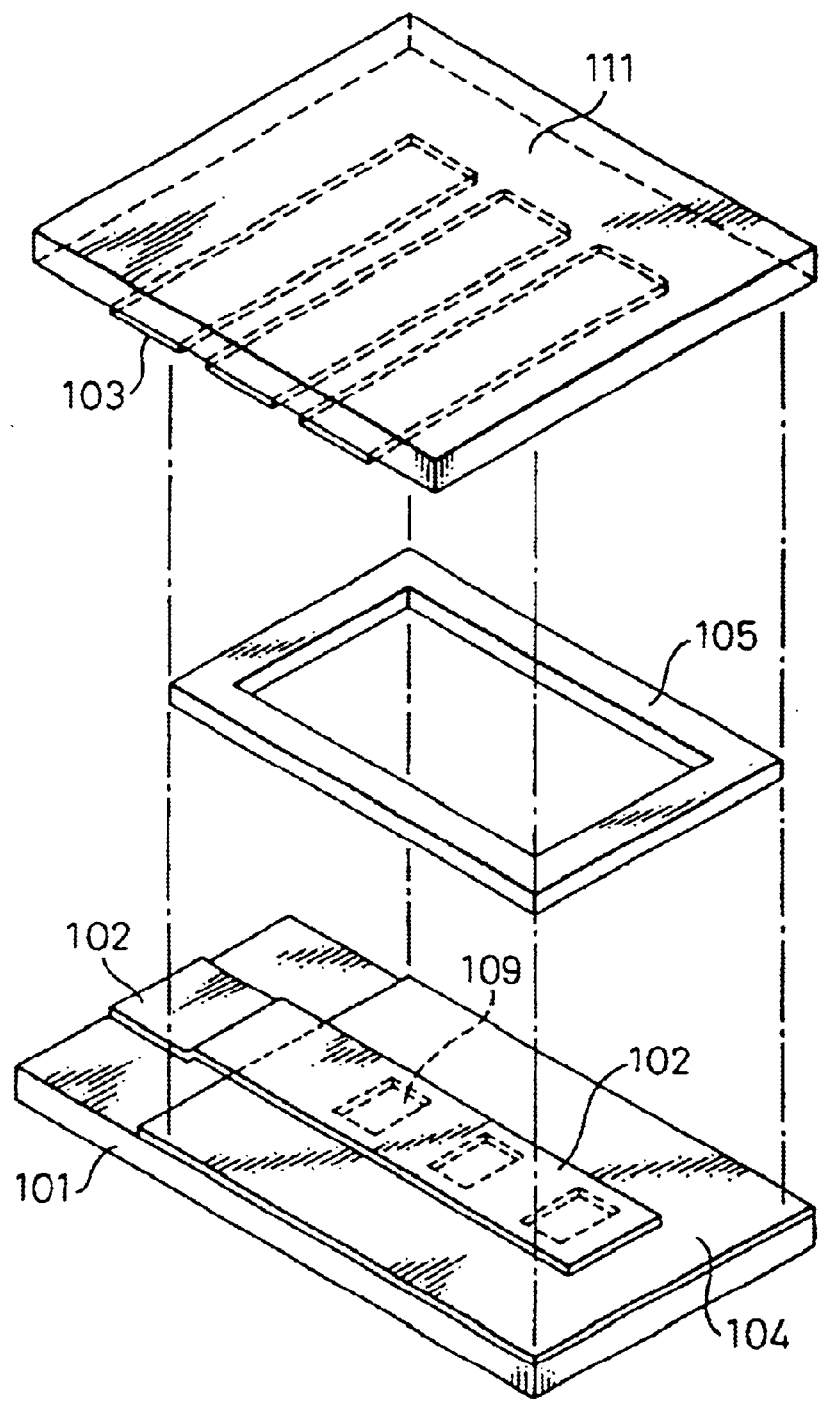

Fig.20(a) PRIOR ART
Fig.20(c) PRIOR ART
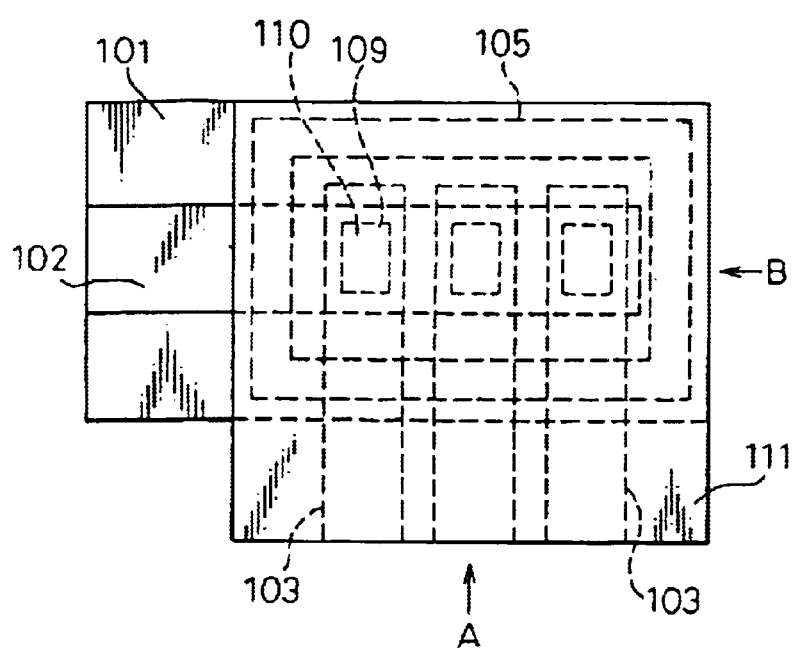
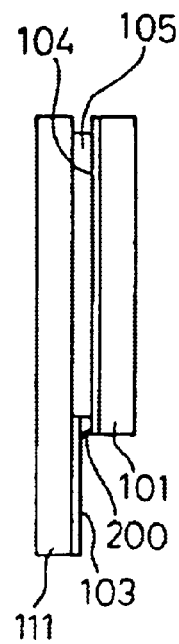
Fig.20(b) PRIOR ART
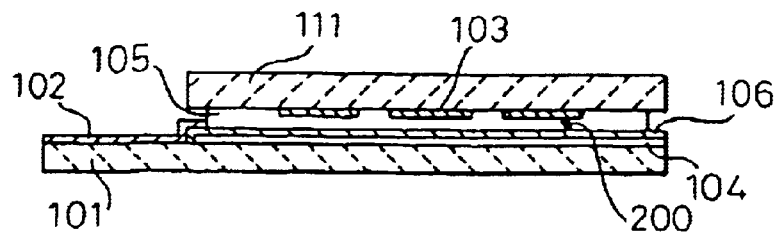

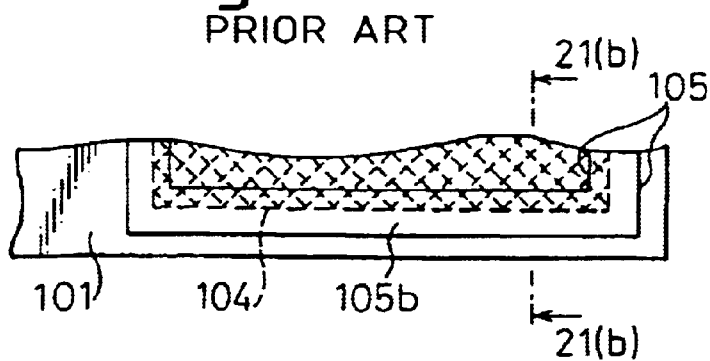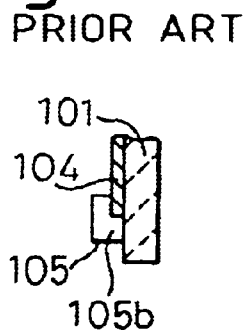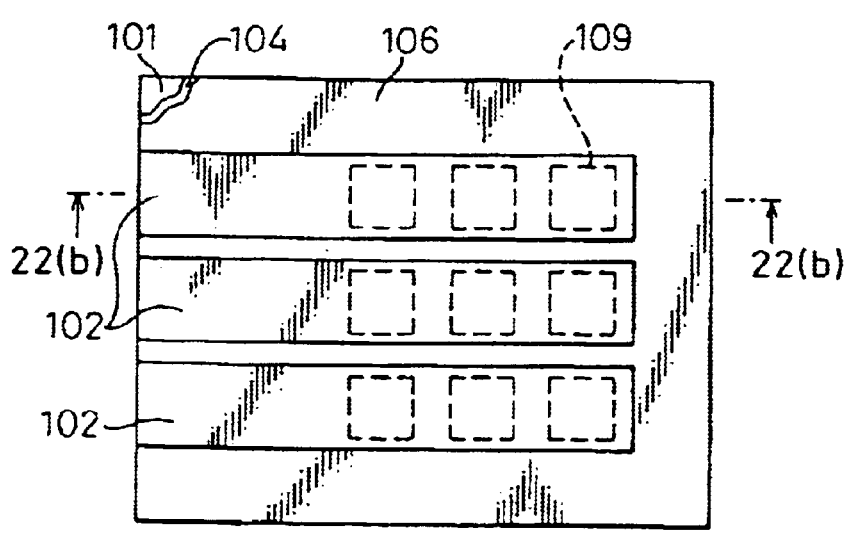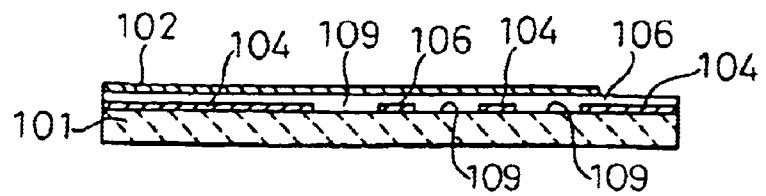

LCD HAVING DUMMY ELECTRODES OR LIGHT-CUTTING FILM WITH CURRENT LEAKAGE PREVENTING SLITS

TECHNICAL FIELD

The present invention relates to a liquid crystal apparatus with a leak current preventing function. In particular, a first invention relates to a liquid crystal apparatus which prevents leak current flowing in a dummy electrode, in a liquid crystal apparatus which has the dummy electrode in order to make uniform a gap between upper and lower transparent substrates in which a liquid crystal layer is inserted therebetween. Further, a second invention relates to a liquid crystal apparatus which prevents leak current flowing in a light-cutting film, in a liquid crystal apparatus in which the light-cutting film is provided on a transparent substrate in order to cut off unnecessary light provided in a liquid crystal unit.

The liquid crystal apparatus with the leak current preventing function according to the present invention is advantageously applied to various products using the liquid crystal apparatus, for example, a liquid television receiver, a liquid crystal monitor, a liquid crystal projector, a liquid crystal view finder, a liquid crystal shutter, a liquid crystal printer, etc.

BACKGROUND ART

First, the background of the first invention will be explained below.

In a liquid crystal apparatus, unevenness of brightness occurs on a screen if a thickness of the liquid crystal layer, which is inserted between at least a pair of upper and lower transparent substrates, is not provided uniformly on the whole of the screen. Usually, the thickness of the liquid crystal layer (that is, a gap between the upper and lower transparent substrates) is determined based on the thickness of a ring-like sealing member, which is provided between the upper and lower transparent substrates for sealing the liquid crystal, and based on a diameter of a spacer.

When obtaining a predetermined gap between the transparent substrates by adjusting the thickness of the sealing member and the diameter of the spacer, in the case that the thickness of a transparent electrode film which is formed on each upper and lower transparent substrates cannot be ignored compared to the thickness of the liquid crystal layer, color appearance is changed in accordance with presence or absence of the transparent electrodes at both sides of the upper and lower transparent substrates, so that unevenness of color occurs on the image. As countermeasure to the above unevenness of color, a dummy electrode having the same film thickness as a drive electrode (i.e., one transparent electrode) and being not used for driving the liquid crystal is provided between the upper and lower transparent substrates in order to adjust the gap therebetween.

Further, in accordance with miniaturization of the liquid apparatus, there is a case that the drive electrode must be provided under the sealing member, depending on a relationship on the wiring space, as well as the above case, the dummy electrode also must be provided under the sealing member in order to make uniform the gap between the upper and lower transparent substrates. Further, when a width of the dummy electrode is set to a value larger than that of the drive electrode, the dummy electrode is provided across a plurality of drive electrodes. In this case, as mentioned below, since the drive electrode is short-circuited to the drive electrode of the upper transparent substrate through the dummy electrode, the width and shape of the dummy electrode are the same as that of the drive electrode so that the dummy electrode is arranged face-to-face with the drive electrode.

In this case, however, leak current flows on the dummy electrode which is arranged in the above-mentioned configuration. This is because, as explained in detail below, in the manufacturing process of the liquid crystal apparatus, when contacting the upper and lower transparent substrates with pressure, an insulating film is broken by conductive particles so that the drive electrode and the dummy electrode are short-circuited and the leak current flows on the dummy electrode. As a result, difference occurs on voltage supplied to liquid elements corresponding to the dummy electrode due to the leak current so that unevenness of color or brightness of the image occurs on the surface of the screen.

Next, the background of the second invention will be explained below.

In the above-mentioned liquid crystal apparatus, an image area having one or more liquid crystal elements is formed on the liquid crystal layer inside of the sealing member between the upper and lower transparent substrates, and the light transmission of the liquid crystal is controlled on the image area by controlling the supply voltage between the upper and lower transparent electrodes. In this case, the image brightness of each liquid element is set based on the data so that characters and image are formed on the image area. In this configuration, the light is always transmitted through the gap between the liquid crystal elements and through peripheral portions so that the image on the liquid crystal elements becomes unclear. Accordingly, a light-cutting means is provided to the gap and to peripheral portions in order to cut off unnecessary light as already known in the conventional liquid crystal apparatus.

As a first aspect of the liquid crystal apparatus having the above light-cutting means, there is a known means. That is, the image area, which is arranged inside the sealing member and between the liquid crystal elements, and the peripheral portions in the vicinity of the liquid crystal elements, are cut off by the light-cutting means which are provided to one of upper and lower transparent substrates. Further, the peripheral portions of the image area, which are arranged inside the sealing member apart from the liquid crystal elements, are cut off by a partition means which is called a "mikiriban" and is mounted to a holder which supports the upper and lower transparent substrates.

Further, as a means for solving the above-mentioned problems, a second aspect of the liquid crystal apparatus having the following light-cutting means has been known. That is, a light-cutting film is arranged between the liquid crystal elements and in the peripheral area surrounding the image area on at least one of upper and lower transparent substrates. In this case, it may be possible not to use a "mikiriban".

In the above second aspect, however, dust and waterdrops become attached between a leading portion of a signal electrode consisting of an ITO film and a light-cutting film consisting of a Cr film, and the signal electrode is short-circuited to the light-cutting film so that the leak current flows therebetween. As a result, an accident in which the signal electrode is short-circuited to the common electrode occurs. When the leak current occurs due to short-circuit, as mentioned above, it is impossible to display the image on the areas relevant to the liquid crystal elements between these electrodes. Accordingly, in order to avoid the leak current due to short-circuit between these electrodes, there is a structure formed so as not to project the light-cutting film from the sealing member to avoid dust and waterdrops. However, a sufficient effect cannot be obtained in the above mentioned countermeasure.

SUMMARY OF THE INVENTION

Accordingly, based on the above-mentioned background, the object of the first invention is to prevent the leak current flowing in the dummy electrode in the liquid crystal apparatus including the dummy electrode.

In order to achieve the above object, according to the first invention, the liquid crystal apparatus with the leak current preventing function includes; a first and second transparent substrates arranged opposite to each other; a first and second transparent electrodes, for an image, both formed opposite inner surfaces of the first and second transparent substrates; a sealing member forming the gap for sealing the liquid crystal and for arranging the liquid crystal injecting area between the first and second transparent substrates; a plurality of conductive particles included dispersedly within the sealing member; non-pixel electrodes which are formed on the position covered by the sealing member for the first and second transparent electrodes; and dummy electrodes formed opposite to the non-image electrodes on the position in which the first and second transparent substrates are covered by the sealing member; wherein the dummy electrode is divided by a plurality of slits.

Further, based on the above-mentioned background, the object of the second invention is to prevent the leak current flowing in the light-cutting film in the liquid crystal apparatus including the light-cutting film.

In order to achieve the above object, according to the second invention, the liquid crystal apparatus with the leak current preventing function includes; first and second transparent substrates arranged opposite to each other; first and second transparent electrodes for image both formed opposite inner surfaces of the first and second transparent substrates; a sealing member forming the gap for sealing the liquid crystal and for arranging the liquid crystal injecting area between the first and second transparent substrates; and a conductive light-cutting film provided at least one inner surface of the first and second transparent substrates for cutting off the unnecessary light in the image area and peripheral area; wherein the light-cutting film is provided at least in portions overlapped to the sealing member and in the vicinity of that portions, and divided into a plurality of sub light-cutting films by the slits.

BRIEF EXPLANATION OF DRAWINGS

FIG. 12(a) is an upper view, FIG. 12(b) is a side view from an arrow A in FIG. 12(b), and FIG. 12(c) is a side view from the arrow B in FIG. 12(a).

FIG. 14(a) is an upper view, FIG. 14(b) is a cross-sectional view along 14(b)—14(b) line, and FIG. 14(c) is a cross-sectional view along 14(c)—14(c) line.

FIG. 16(a) is an upper view, FIG. 16(b) is a cross-sectional view along 16(b)—16(b) line, and FIG. 16(c) is a cross-sectional view along 16(c)—16(c) line.

FIG. 19 is an exploded perspective view showing one structural example of the liquid crystal apparatus according to the second embodiment of the present invention.

FIGS. 20(a), 20(b) and 20(c) show structures for assembly of the liquid crystal apparatus shown in FIG. 19, FIG. 20(a) is an upper view, FIG. 20(b) is a side view from the arrow A, and FIG. 20(c) is a side view from the arrow B.

FIGS. 21(a) and 21(b) show modified structures of the liquid crystal apparatus shown in FIG. 20.

FIGS. 22(a) and 22(b) show structural views of the lower glass substrate 101 according to one example of a conventional liquid crystal apparatus.

BEST MODE OF CARRYING OUT THE INVENTION

The first invention will be explained below. First, before describing the embodiment of the first invention, a conventional art and its problems will be explained below.

Figure 5:
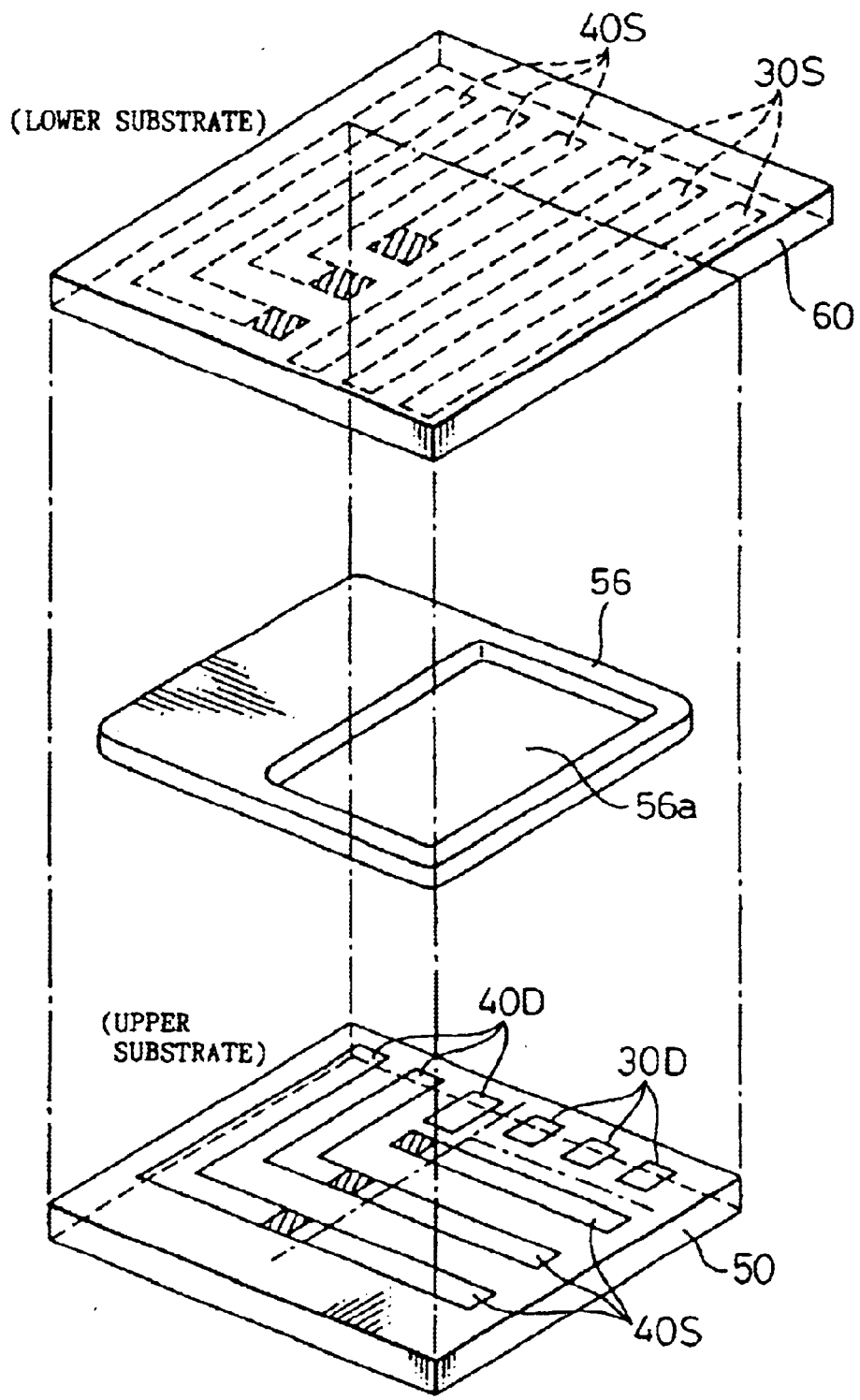
FIG. 5 is a perspective view for assembly indicating an essential structure of a conventional liquid crystal apparatus.
Figure 6:
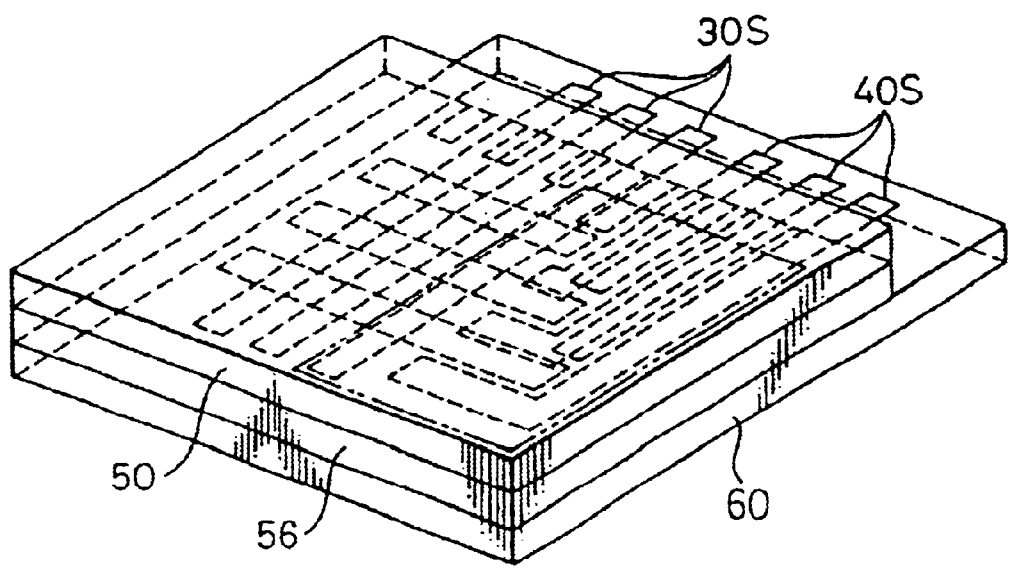
FIG 6 is a perspective view after assembly of the liquid crystal apparatus shown in FIG. 5.

FIG. 5 is a perspective view for assembly indicating the essential structure of the conventional liquid crystal apparatus. In the drawing, 50 is an upper transparent substrate, 56 is a sealing member formed by ring-like shape around an image window 56a, 60 is a lower transparent substrate. The liquid crystal is inserted and sealed in the range of the sealing member 56 which is held between the upper and lower substrates 50 and 60. FIG. 6 is a perspective view of the liquid crystal apparatus after assembly, and FIG. 7 is a plan view of FIG. 6.

Figure 7:
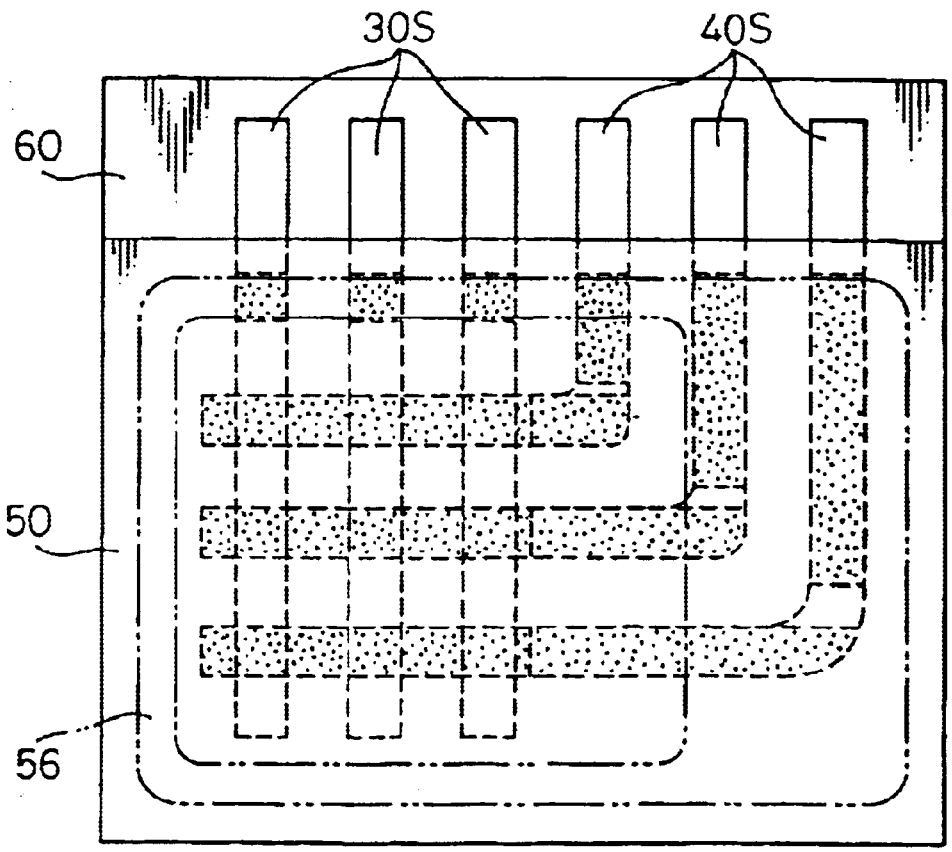
FIG. 7 is a plan view of FIG. 6.

As shown in FIGS. 5 to 7, in the opposite surface of the liquid crystal on the upper transparent substrate consisting of the glass or polymer, a plurality of wiring patterns 40S (below, "common electrode 40S") each of which is a scan line drive electrode (below, "common electrode") consisting of the transparent electrode film. Further, in the opposite surface of the liquid crystal on the lower transparent substrate consisting of the glass or polymer, a plurality of wiring patterns 30S (below, "signal electrode 30S") each of which is a signal line drive electrode (below, "signal electrode") consisting of the transparent electrode film. Still further, as shown in the drawing, a plurality of both wiring patterns 30S and 40S are arranged in parallel, and each wiring pattern 30S is intersected with each wiring pattern 40S each other in the straight portion thereof.

In the above liquid crystal apparatus, usually, the electrode wiring method, which is called "transfer method", is used in order to connect the common electrode with the signal electrode. According to this method, for example, in order to supply the liquid crystal drive signal to the common electrode 40S on the upper transparent substrate 50, the common electrode 40S is sealed by the sealing member containing conductive particles, and is connected to the signal electrode on the lower transparent substrate 60 using the conductive particles contained within the sealing member 56. Further, the common electrode 40S is driven through the upper transparent substrate 60 on the wiring pattern 30S of the signal electrode.

In this case, the wiring pattern 40S of the common electrode is formed in the side of the lower transparent substrate 60 of the sealing member 56, as the wiring pattern of the transfer method. Further, in some cases, the wiring pattern 40D for the dummy electrode must be provided to the side of the upper transparent substrate 50 of the sealing member 56 and opposite to the wiring pattern 40S as the transfer method, in order to maintain the gap in constant therebetween. In the examples shown in FIGS. 5 to 7, the wiring pattern 30D on the upper transparent substrate 50 is the dummy electrode for the signal electrode, and wiring pattern 40D on the upper transparent substrate 50 is the dummy electrode for the common electrode.

Figure 8:
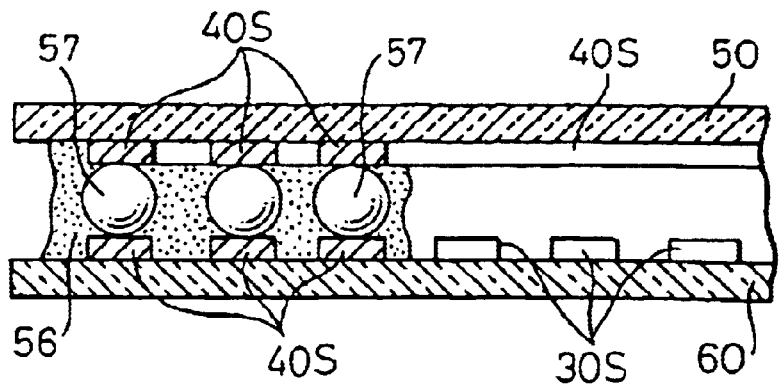
FIG. 8 is a view for explaining essential parts of a transfer method.

FIG. 8 is an essential view for explaining the transfer method. In the above structure, concretely, as shown in FIG. 8, in order to connect the common electrode 40S at the upper side of the sealing member 56 with the common electrode 40S at the lower side of the sealing member 56 (i.e., in order to transfer the signal), a plurality of conductive particles 57 each having a very small diameter are arranged dispersedly within the sealing member 56. Accordingly, the upper and lower electrodes 40S are connected each other through the conductive particles 57. Further, the conductive particles 57 are used for determining the gap between the upper and lower transparent substrates.

Figure 9:
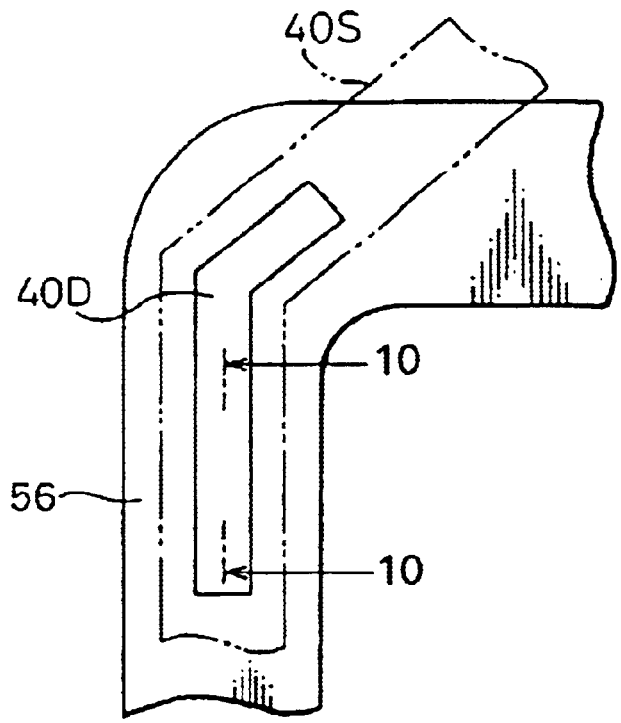
FIG. 9 is an essential structure of a conventional dummy electrode.
Figure 10:
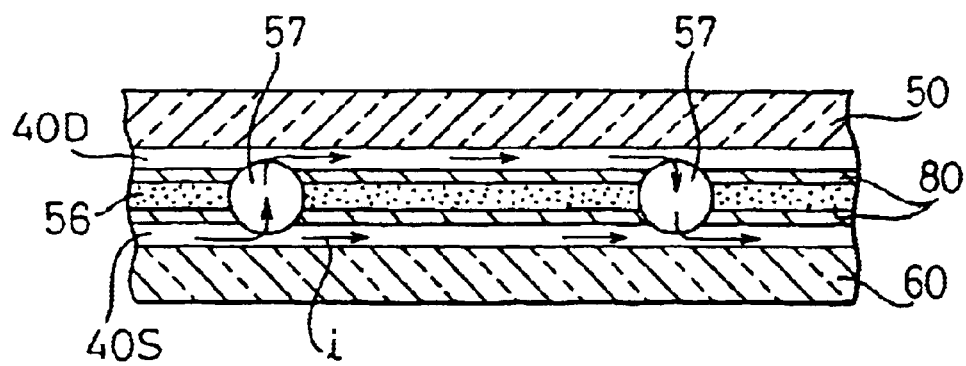
FIG. 10 is a view for explaining problems at the structure of FIG. 9, and a detailed cross-sectional view along 10—10 line in FIG. 9.

FIG. 9 shows an essential structure of a conventional dummy electrode. In order to concretely explain the above structure, the arrangement relationship among each part of the common electrode 40S, the dummy electrode 40D and sealing member 56 is shown by the plan view in FIG. 9. Further, FIG. 10 is a view for explaining problems of the structure shown in FIG. 9, and shows the detailed cross-sectional structure along A—A in FIG. 9.

As shown in FIG. 9, the common electrode 40S is arranged at the back of the sealing member 56, and the dummy electrode 40D is arranged at the front of the sealing member 56. In this case, as shown in FIG. 10, insulating films 80 are arranged between the dummy electrode 40D and the sealing member 56, and between the common electrode 40S and the sealing member 56, in order to electrically insulate the common electrode 40S and the dummy electrode 40D.

However, the conductive particle 57 occasionally breaks through the insulating film 80 due to the pressure applied thereto when coupling the upper transparent substrate 50, the lower transparent substrate 60 and the sealing member 56, in the manufacturing process. When the conductive particle 57 breaks through the upper and lower insulating films 80, the common electrode 40S and the dummy electrode 40D are short-circuited through the conductive particle 57. As a result, as shown by arrows in FIG. 10, the current i which flows in the common electrode 40S, flows in the dummy electrode 40D as the leak current. Accordingly, when the leak current flows in the dummy electrode 40D, the dummy electrode 40D appears to be the wiring in parallel to the common electrode 40S so that the resistance value of the common electrode 40S is reduced equivalently.

Due to the leak current which flows in the dummy electrode 40D, there is a difference in wiring resistance between a wiring portion where the leak current flowed and another wiring portion where the leak current did not flow. That is, there is the difference in wiring resistance between the common electrode 40S which is short-circuited to the dummy electrode 40D and another common electrode 40S which is not short-circuited to the dummy electrode 40D. As a result, there is a difference in voltage supplied to each liquid crystal element so that light and shade appears on the image and this results in deterioration of the image quality.

As mentioned above, there were problems in the conventional dummy electrode as explained in FIG. 10. Accordingly, the first invention aims to provide the structure of the dummy electrode which can resolve the above conventional problems. That is, according to the object of the first invention, even if the conductive particle 57 contained in the sealing member 56 breaks through the insulating film 80, the leak current flowing in the dummy electrode can be reduced and the unnecessary difference in wiring resistance can be prevented so that it is possible to provide good quality of the image.

In order to achieve the above object, in the first invention, as explained in detail below, the dummy electrode is divided by a plurality of slits so that it is possible to cut off the leak current flowing in the dummy electrode even if the conductive particle breaks the insulating film.

As explained above, the dummy electrode is not used as an electronic means and is used for adjusting the gap between the upper and lower transparent substrates in which the liquid crystal is inserted therebetween. Accordingly, if the dummy electrode is divided by the slit, there is no problem as to adjustment of the gap between substrates. Further, even if the conductive particle breaks through the insulating film, the resistance value of the drive electrode is not reduced since no leak current flows across the portion divided by the slit in the dummy electrode. As a result, the image quality is not deteriorated compared to conventional dummy electrode which has no slits.

The embodiment of the first invention will be explained in detail with reference to the drawings below.

Figure 1:
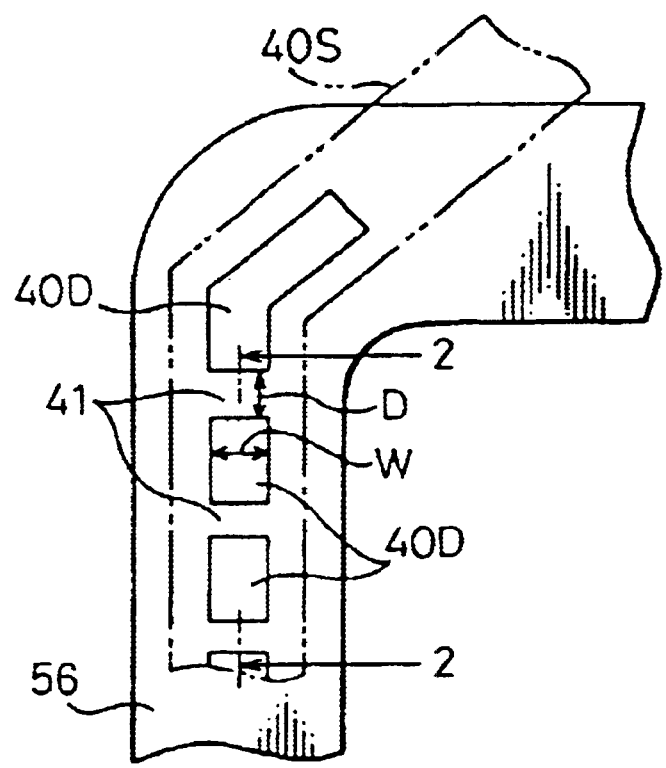
FIG. 1 is an essential plan view of the dummy electrode according to an embodiment of the first invention.
Figure 2:
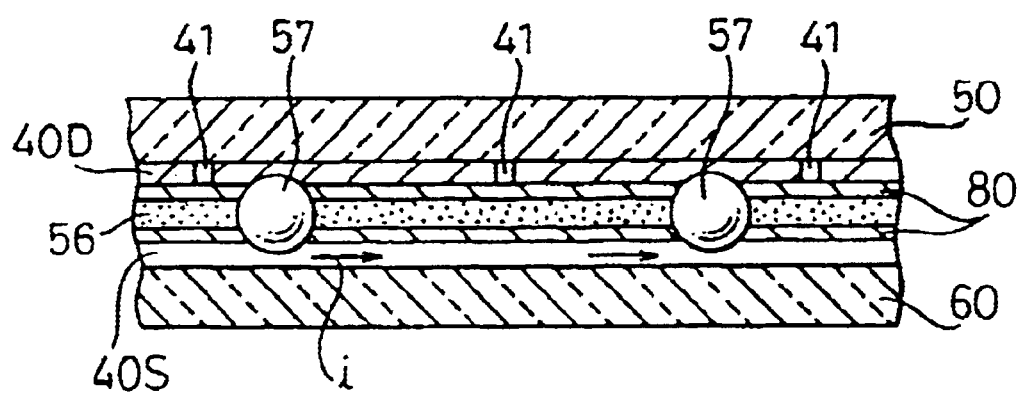
FIG. 2 is a detailed structural view along 2—2 line of FIG. 1.

FIG. 1 is an essential plan view of the dummy electrode according to an embodiment of the present invention, FIG. 2 is a detailed structural view along 2—2 line in FIG. 1, FIG.

Figure 4:
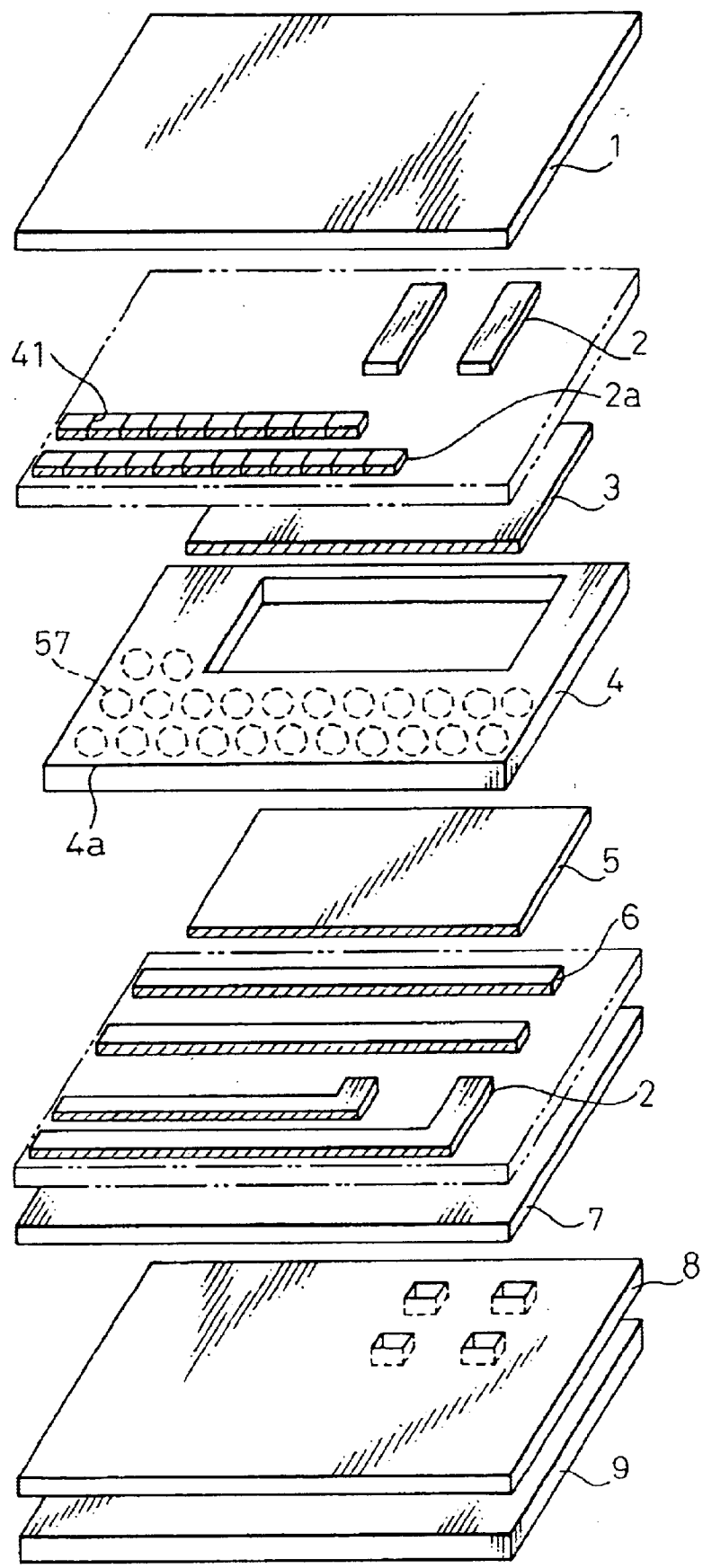
FIG. 4 is an exploded perspective view for explaining the whole of the first invention.

3 is an essential-exploded and perspective view of the first invention, and FIG. 4 is an exploded perspective view for explaining the whole of the first invention.

In FIGS. 1 and 2, 40S is the common electrode, 40D is the dummy electrode, 41 is the slit for dividing the dummy electrode 40D, and 56 is the sealing member for dispersedly containing the conductive particles 57.

The whole of the liquid crystal apparatus is the same structure as shown in FIG. 5, and in FIGS. 5 to 10 except that a plurality of slits are provided to the dummy electrode. Further, the common electrode 40S and the signal electrode 30S are provided as the drive electrode, and the dummy electrode 40D and the dummy electrode 30D are provided corresponding to the common electrode 40S and the signal electrode 30S.

As shown in FIG. 1, a plurality of slits 41, each having a width D larger than a diameter of the conductive particle but smaller than a width W, are provided with appropriate space. In this case, each space between slits is determined based on the density of conductive particles contained in the sealing member 56. That is, the slit may be provided with optional space in accordance with the density of the conductive particles 57 in the sealing member 56. Further, the width D of the slit 41 is narrow in the range where divided dummy electrodes 40D are not short-circuited to each other. In this case, in order to prevent the short-circuit between the dummy electrodes due to the conductive particle 57, it is necessary to set the width D larger than the diameter of the conductive particle 57.

As mentioned above, the dummy electrode 40D (30D) is provided for adjusting the gap between the upper and lower transparent substrates in which the liquid crystal is inserted therebetween. Accordingly, although the dummy electrode 40D (30D) is divided by the plurality of slits 41 with appropriate spaces, there is no problem when adjusting the gap between the upper and lower transparent substrates. Furthermore, according to the dummy electrode 40D divided by the plurality of slits 41, it is possible to reduce the difference of the wiring resistance of the drive electrode compared to the conventional continuous dummy electrode, since the wiring resistance of the drive electrode is not reduced even if the conductive particle 57 breaks through the insulating film 80.

Figure 3:
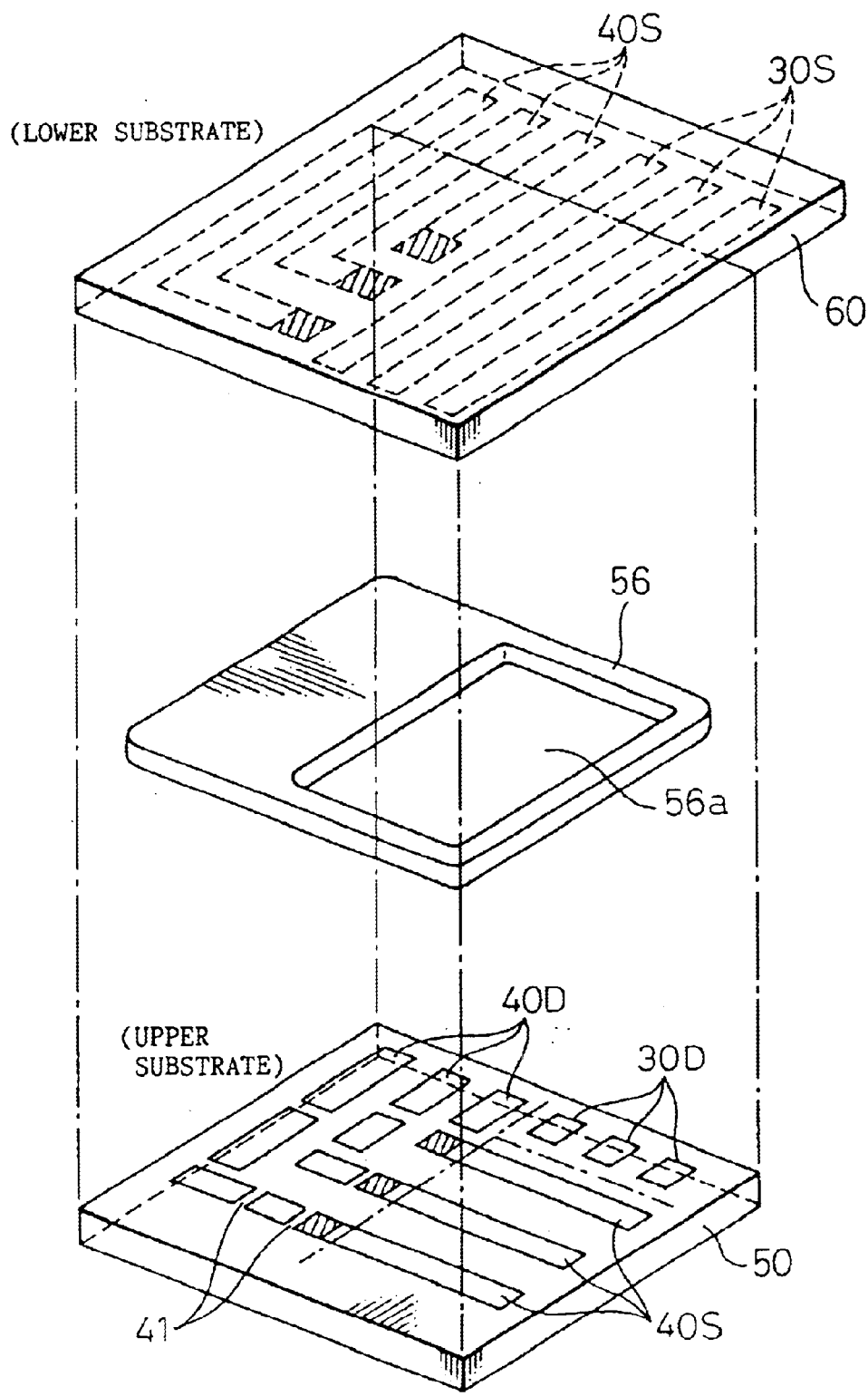
FIG. 3 is an essential and exploded perspective view of the first invention.

In FIG. 3, 41 is the slit provided on the dummy electrode 40D. Further, the slant-line area of the end of each drive electrode 40S is a connection point (transfer contact point) to connect the drive electrode 40S on the upper transparent substrate to the drive electrode 40S on the lower transparent substrate. This area is the same structure as shown in FIG. 8 and is connected to the conductive particle 57. The conductive particles 57 are dispersedly arranged within the sealing member 56 with appropriate density. Accordingly, as mentioned above, it is possible to contact the upper electrode with the lower electrode by coupling the upper and lower substrates with pressure.

In FIG. 4, 1 is the upper transparent substrate (This corresponds to 50 in FIG. 2, and so forth.), 2 is the common electrode (40S) consisting of an ITO film, 2a is the dummy electrode (40D) having a plurality of slits 41 arranged dispersedly, 3 is an upper orientation film, 4 is the sealing member (56) including a plurality of conductive particles 57 arranged dispersedly therein, 5 is a lower orientation film, 6 is the signal electrode (30S) consisting of the ITO film, 7 is an insulating film, 8 is a light-cutting black matrix, and 9 is the lower transparent substrate (60).

As mentioned above, a plurality of slits 41 are provided on the dummy electrode with a predetermined pitch. The leak current flowing in the dummy electrode is cut off by the slits. Further, the upper and lower position between the common electrode 2 and the dummy electrode 2a coincide with each other, the shape of the common electrode 2 is similar to the dummy electrode 2a, and the dummy electrode is arranged along the side of the sealing member 4. That is, in this example, as shown in the drawing, the dummy electrode 2a is arranged along the side 4a of the sealing member 4. The insulating film 7 and the light-cutting black matrix 8 are will be explained in detail in the second invention as mentioned below.

As explained above, according the first invention, there are the following effects, i.e., it is possible to provide an appropriate gap between the upper and lower transparent substrates. At the same time, in the manufacturing process, even if a conductive particle, which is contained within the sealing member, breaks the insulating film, no current flows in the dummy electrode so that it is possible to obtain good image quality.

Next, the second invention will be explained in detail below. First, before describing the embodiment of the second invention, the conventional art and their problems will be explained below.

As mentioned above, in the liquid crystal apparatus, the image area consisting of a plurality of liquid crystal elements is formed between the upper and lower transparent electrodes and inside the sealing member. The light transmittance of the liquid crystal is controlled by controlling the supply voltage between the upper and lower electrodes in the image area, the brightness of each liquid crystal element is set to the predetermined value based on the data, and characters and figures are formed on the image area.

In this case, the light is always transmitted through the gap between the liquid crystal elements and the peripheral portion thereof so that the image of the liquid crystal becomes unclear. Accordingly, there is a known liquid crystal apparatus having a light-cutting means to cut off unnecessary light at the gap and peripheral portion.

As a first aspect of the liquid crystal apparatus having the light-cutting means, the following explanation is given as to an example in which the liquid crystal apparatus is used as a display apparatus. That is, in the display area inside the sealing member, the gap between the liquid crystal elements and the peripheral portion near the liquid crystal element are cut off by the light-cutting film which is provided at one of the upper and lower transparent substrates, and the peripheral portion of the display area at the inner side of the sealing member apart from the liquid crystal element is cut off by a partition means (or "mikiriban") which is provided to a holder for supporting the upper and lower substrates.

In this case, however, since the light-cutting film and the partition board are separately provided to another member, the position error occurs therebetween when assembling the display unit. As a result, there is an area which cannot be covered by the partition means in the peripheral portion of the light-cutting film so that unnecessary light is transmitted therethrough. Furthermore, there is the case in which a part of the display window, which is provided to the light-cutting film, is cut off by the partition means so that the display is in an incomplete state.

In order to resolve the above drawback, there is a known second aspect of the liquid crystal apparatus having the light-cutting means as mentioned below. That is, in the second aspect of the liquid crystal apparatus, the light-cutting film is provided to at least one of the upper and lower transparent substrates for cutting off the light broadly at the peripheral area surrounding the liquid crystal element and the area therebetween. In this case, no partition means may be provided thereto.

FIG. 19 is an exploded perspective view which shows one example of the second aspect of the liquid crystal apparatus. As shown in FIG. 19 which represents a conventional art, the signal electrode 103 consisting of an ITO film is provided to the lower surface of the upper glass substrate 111 which is the upper transparent substrate. Further, the light-cutting film 104 consisting the Cr film is provided to the upper surface of the lower glass substrate 101 which is the lower transparent substrate, and one common electrode 102 consisting of the ITO film is provided on the light-cutting film 104. The light-cutting film 104 has a plurality of windows 109 corresponding to the liquid crystal elements explained below.

The upper glass substrate 111 is superposed on the lower glass substrate 101 through the sealing member 105 consisting of an adhesive member, and the substrates are bonded to each other with a predetermined gap by using the spacer in order to form the space for the liquid crystal. The liquid crystal is injected into the space from an injecting hole (not shown) provided on the sealing member 105, and the injecting hole is sealed so that the liquid crystal apparatus has the structure shown in FIGS. 20(a) to 20(c).

In FIG. 19, the orientation film (see number 3 in FIG. 4) is provided on the common electrode 102 and the lower glass substrate 101, and the light-cutting film is provided on the lower glass substrate 101. Further, the orientation film (see number 5 in FIG. 4) is provided on the lower surface of the upper glass substrate 111 and the signal electrode 103.

FIGS. 20(a) to 20(c) are a structural view of the assembly of the liquid crystal apparatus shown in FIG. 19. In FIG. 20, (a) is an upper view, (b) is a side view observed from the arrow A in FIG. 20(a), and (c) is a side view observed from the arrow B in FIG. 20(a). As shown in FIG. 20(a), the liquid crystal element 110 is formed in an intersected portion of the signal electrode 103 and the common electrode 102. The following areas, i.e., the gap between the liquid crystal elements 110, the peripheral portion of the liquid crystal element 110 and the wide area of the edge surrounding the liquid crystal element 110, are covered by the light-cutting film 104. For the area of the liquid crystal element 110, the light can be transmitted only through an area overlapped with the window 109 provided on the light-cutting film 104. As a result, this area becomes, substantially, an image area.

Accordingly, the transmission of unnecessary light can be completely obstructed in this example, the image area also can be ensured, and a clear image can be displayed based on the display signal. Accordingly, it is possible to improve the above mentioned problems at the first aspect of the liquid crystal apparatus in which the partition member is used. In this case, the liquid crystal apparatus shown in FIG. 20, a polarization sheet is mounted to each of the lower surface of the lower glass substrate 101 and the upper surface of the upper glass substrate 111.

In the liquid crystal apparatus shown in FIGS. 19 and 20, however, there are the following problems. That is, as shown in FIGS. 20(b) and 20(c), the light-cutting film 104 is larger than the sealing member 105 and projects outside the sealing member 105. Accordingly, in the outside of the sealing member 105, dust 200 and water drops are attached between the leading portion of the signal electrode 103 consisting of the ITO film and the light-cutting film consisting of the Cr film. As a result, the signal electrode 103 and the light-cutting film 104 are interconnected each other, and the signal electrode 103 and the common electrode 102 are short-circuited each other so that a short-circuit may occur therebetween. If the above short-circuit occurs, it is impossible to display the image area between these electrodes.

On the other hand, in order to avoid the above short-circuit between the electrodes, it is necessary to take account so as not to project the light-cutting member 104 from the sealing member 105. In order to resolve this problem, it is necessary to provide the light-cutting film 104 in such a manner that the outer part of the light-cutting film 104 is smaller than the outer part of the sealing member 105. In this case, when taking into account factors of fluctuation, such as an error of positioning between the light-cutting film 104 and the sealing member 105 and change of the size of bonding of the sealing member in actual use, the size of the outer part of the light-cutting film 104 must be set to sufficiently smaller size than the outer part of the sealing member 105.

However, when the size of the light-cutting film 104 is set sufficiently smaller than the size of the sealing member 105, as shown in FIGS. 21(a) and 21(b), there is a light-transmitting area 105(b), in which the light is not cut off, in the lower portion of the sealing member 105. The light transmitted through the light-transmitting area 105b is scattered and input to the image area so that the image quality of the liquid crystal apparatus deteriorates. In this case, FIG. 21 is a structural and modified view of the liquid crystal apparatus shown in FIG. 20, (a) is an essential upper view for explanation, and (b) is a 21(b)—21(b) cross-sectional view in FIG. 21(a), the upper glass substrate, etc., is omitted in these figures.

As still another conventional liquid crystal apparatus, as the second aspect, there is a known liquid crystal apparatus in which the light-cutting film is provided on the transparent substrate having a plurality of common electrodes (i.e., a plurality of signal electrodes are also provided).

FIGS. 22(a) and 22(b) are structural views regarding the lower glass substrate 101 according to one example of the conventional liquid crystal apparatus, (a) is an upper view, and (b) is an 22(b)—22(b) cross-sectional view in FIG. 22(a). In this case, the structure of the upper glass substrate and the sealing member used in this liquid crystal liquid apparatus is the same structure as the upper glass substrate 111 and the sealing member 105 shown in FIG. 19.

As shown in FIGS. 22(a) and 22(b), the light-cutting film 104 consisting of the Cr film is provided on the whole of the upper surface of the lower glass substrate 101 and a plurality of common electrodes each consisting of the ITO film are superposed on the light-cutting film 104 through the insulating film 106 consisting of the resin. As a result, the passage between the plurality of common electrodes and the light-cutting film 104 can be obstructed. As mentioned below, the window 109 corresponding to the liquid crystal elements is arranged on the light-cutting film 104 in a matrix.

Figure 23:
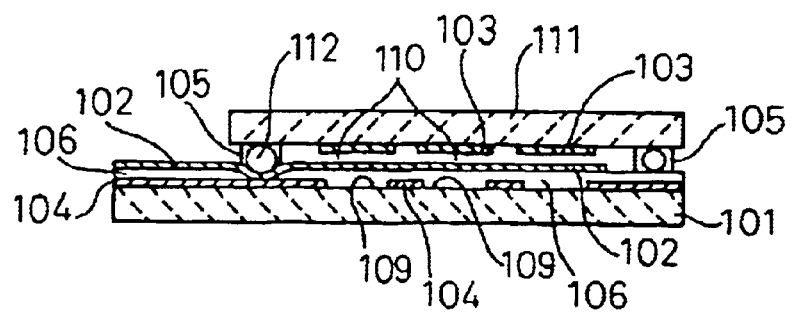
FIG. 23 is a cross-sectional view of the liquid crystal apparatus shown in FIG. 22(b).

FIG. 23 is a cross-sectional view of the liquid crystal apparatus which corresponds to the structure of FIG. 22(b). Further, based on the same method as the liquid crystal apparatus shown in FIG. 20, the lower glass substrate and the upper glass substrate are bonded by the sealing member, and the liquid crystal apparatus shown in. FIG. 23 is formed. In the liquid crystal apparatus shown in FIG. 23, the liquid crystal elements 110 are arranged in a matrix in the area intersected by the common electrode 102 and the signal electrode 103. The gap between the liquid crystal elements 110, the peripheral portions thereof and outer area thereof are covered by the light-cutting film 104, and the light can be transmitted only through the portion overlapping the window 109 provided in the light-cutting film 104, within the area of the liquid crystal elements 110. This area becomes substantially an image area so that it is possible to obtain clear image in matrix.

However, there are the following problems in the above liquid crystal apparatus as explained below.

In FIG. 23, 112 is the spacer consisting of a hard material, such as glass, and provided on the sealing member 105. The spacer 112 is used for maintaining the gap in constant between the upper glass substrate 111 and the lower glass substrate 101. In order to maintain the gap, the pressure is added to the upper and lower glass substrates when bonding these substrates, and the sealing member 105 is compressed until the upper and lower glass substrates are contacted to the spacer 112 under pressure.

At that time, as shown in FIG. 23, the common electrode 102 consisting of the ITO film breaks through the insulating film 106 consisting of the resin, due to the pressure of the spacer 112, and may be contacted to the light-cutting film 104 consisting of Cr film. When two or more common electrodes are contacted to the light-cutting film 104, these common electrodes are short-circuited each other through the light-cutting film 104. When a short-circuit occurs between the common electrodes, the drive voltage is supplied to the non-selected common electrode in the case of matrix drive so that the liquid crystal elements having such common electrode perform display operations in error.

Accordingly, in the liquid crystal apparatus which is formed by bonding the upper and lower transparent substrates, each of which has the transparent electrode for driving the liquid crystal, through the sealing member, the object of the second invention aims to resolve the above problems in the conventional liquid crystal apparatus having the light-cutting film to one of the upper and lower transparent substrates for cutting off the unnecessary light, without use of the partition member.

Further, the second invention aims to provide the liquid crystal apparatus having good image or display quality by sufficiently cutting off the unnecessary light, without deterioration of the image or display quality due to the leak current caused by short-circuit between the drive electrodes.

Next, the embodiment of the second invention will be explained with reference to the attached drawings as to the liquid crystal apparatus with a photoprinter. In this embodiment, the explanations are given to the liquid crystal apparatus in which the light-cutting film is provided to the transparent substrate having one common electrode in the upper and lower transparent substrates 111 and 101.

Figure 11:
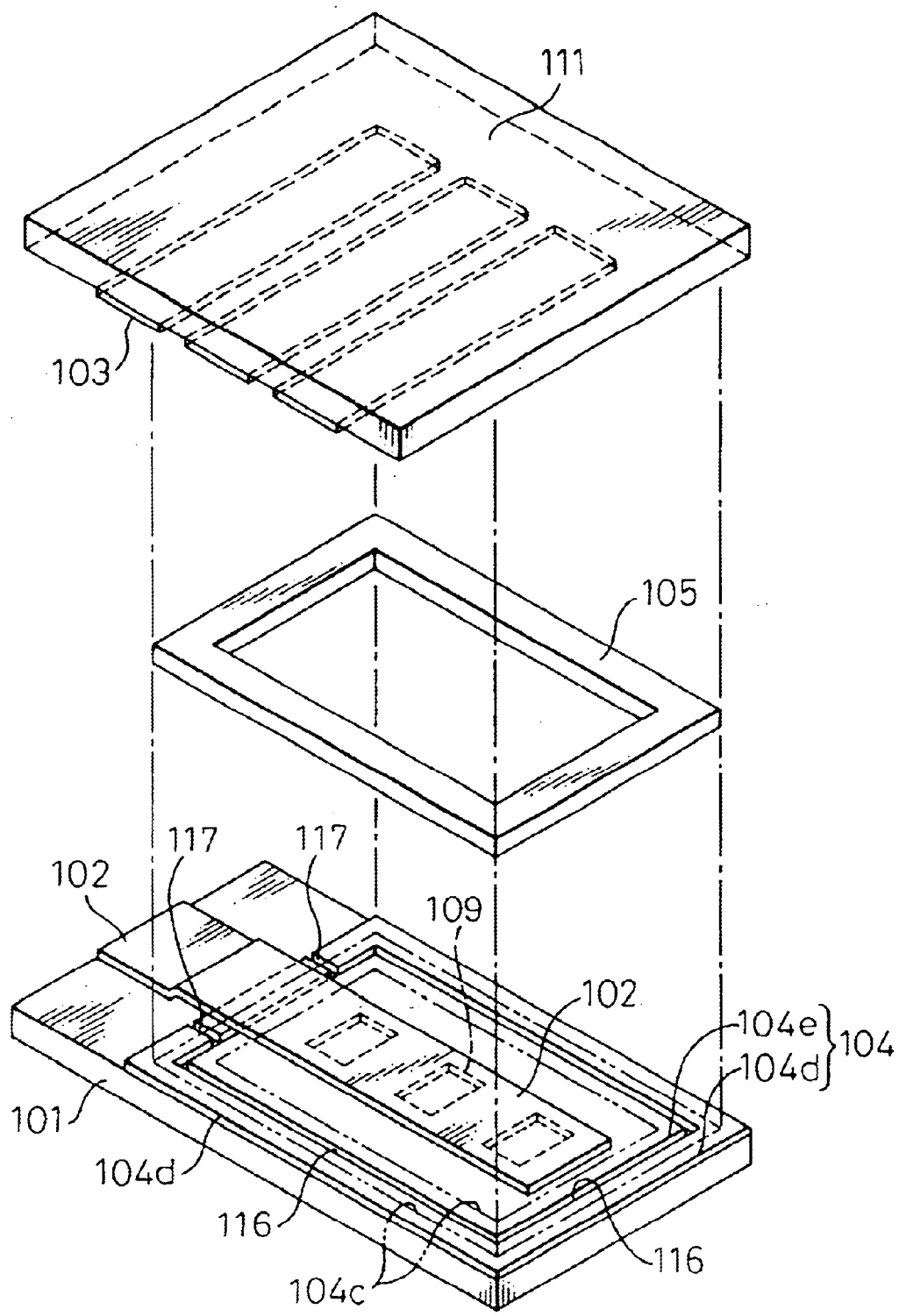
FIG. 11 is an exploded perspective view indicating a liquid crystal apparatus according to a second embodiment of the present invention.

FIG. 11 is an exploded perspective view of the liquid crystal apparatus according to the embodiment of the second invention. As shown in FIG. 11, the upper glass substrate 111 and the sealing member 105 of this embodiment are the same structure and shape as shown in FIG. 19 which shows the conventional art. In the structure of the lower glass substrate 101, the closed-loop like separation slit 116 is provided within the bonding area 104c (i.e., the range surrounded by the chain-dotted line) in which the light-cutting film 104 consisting of Cr film is superposed with the sealing member 105, and the light-cutting film 104 is separated to a profile portion 104d and an internal portion 104e. In this embodiment, the width (or a width of wall of the sealing member 105) of the bonding area 104c is approximately 1000 $\mu$m, and the width of the groove of the separation slit 116 is 30 $\mu$m or less, for example, 26 $\mu$m.

One common electrode 102 consisting of the ITO film is provided on the light-cutting film 104, and two separation slits for dividing the profile portion 104d are provided on the profile portion 104d of the light-cutting film 104 along the common electrode 102. The separation slit 117 is a slit for connecting the separation slit 116 to the outside of the light-cutting film 104, and the profile portion 104 is separated by the separation slit 117. In this case, the width of the separation slit 117 is also 30 $\mu$m or less. The same window as the window 109 shown in FIG. 19 is provided on the light-cutting film 104 (an inside portion is 104e).

Figures 14A, 14B:
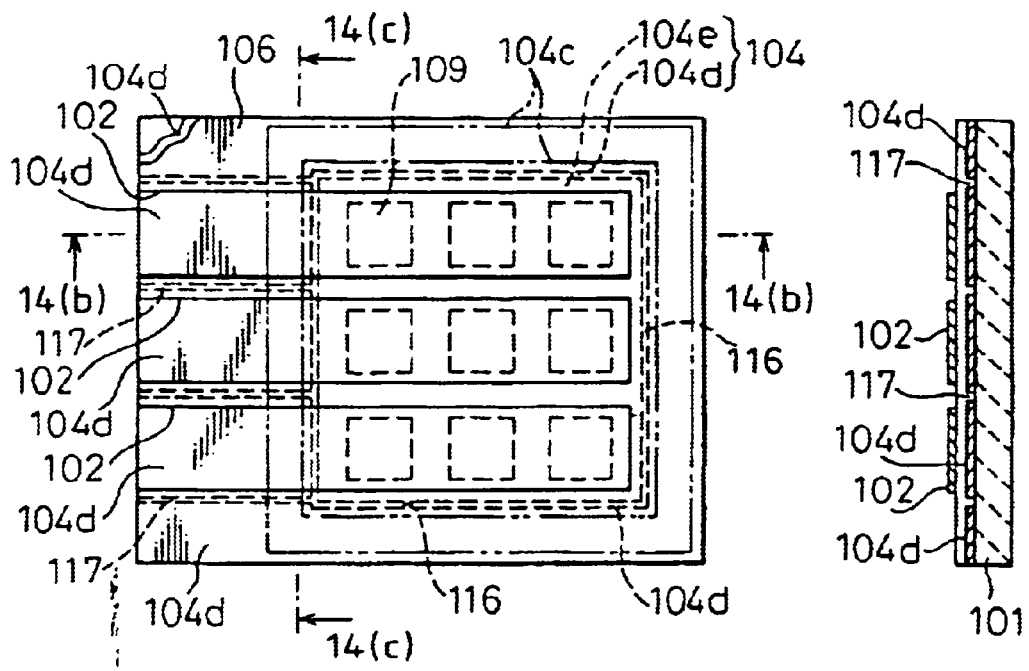
FIGS. 14(a), 14(b) and 14(c) show partial structures of a lower glass substrate 101 shown in FIG. 13.

The upper glass substrate 111 is superposed on the lower glass substrate 101 through the sealing member 105 consisting of the bonding member, and the liquid crystal apparatus having the structure shown in FIG. 12 is formed in the same way as explained in FIG. 20. In FIG. 11, the light-cutting film 104, the insulating film 106, and the common electrode 102 are provided on the lower glass substrate 101. Further, the orientation film (see number 5 in FIG. 4) is provided on the upper surface of the lower glass substrate 101, and another orientation film (see number 3 in FIG. 4) is also provided on the lower surface of the upper glass substrate 111 and the signal electrode 103. Further, the same orientation films are provided on the lower glass substrate and upper glass substrate according to another embodiment of the second invention. Still further, when the separation slit (for example, the same slit as shown by number 107) having the same configuration as shown in FIG. 14(a) is provided to the profile portion 104d of the light-cutting film 104 of the lower glass substrate 101 and opposite to the signal electrode 103 of the upper glass substrate 111 in FIG. 11, it is possible to improve the reliability of the product.

Figure 12A:
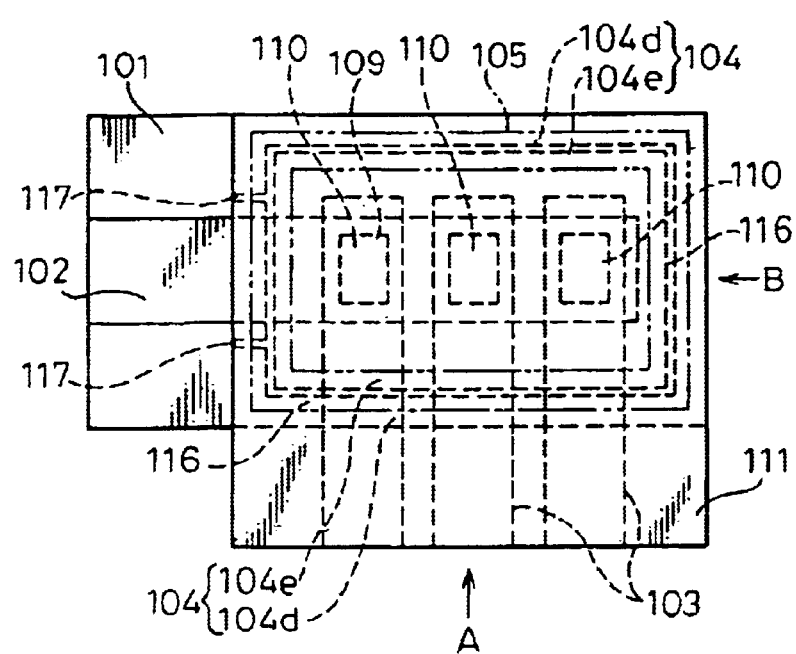
FIGS. 12(a), 12(b) and 12(c) show coupled structures of the liquid crystal apparatus shown in FIG. 11.
Figure 12C:
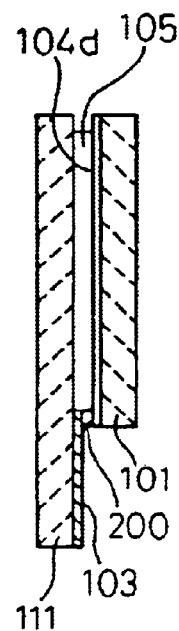
Figure 12B:
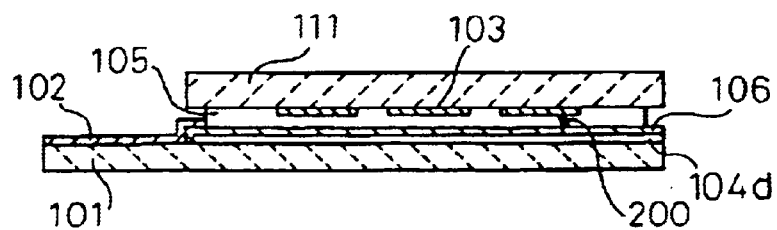

FIG. 12(a), 12(b) and 12(c) are structural views indicating an assembled liquid crystal apparatus from the exploded view shown in FIG. 11, (a) is an upper view, (b) is a side view observed from the arrow A of (a), and (c) is a side view observed from the arrow B of (a). As shown in FIG. 12(a), the liquid crystal elements 110 are provided to the intersected portion of the signal electrode 103 and the common electrode 102. The wide area including the gap between the liquid crystal elements 110, the peripheral portion thereof and the surrounding edges can be covered by the light-cutting film 104 except for the areas of the separation slits 116 and 117. In the area of the liquid crystal elements 110, the light can be transmitted through only the area which is superposed by the window 109 provided to the light-cutting film (i.e., an inner portion 104e) so that this area becomes substantial image area. In this case, as well as the separation slit 117 along the common electrode 102, it is possible to improve the reliability by providing the separation slit along the left and right direction of the signal electrode.

Since the separation slits 116 and 117 are provided to the peripheral portion of the pixel area, and since the width of the slit is 30 $\mu$m or less as mentioned above, in actuality, it is very difficult to recognize the unnecessary light transmitting the peripheral portion so that, substantially, there is no bad influence on the displayed image. Accordingly, in the second invention, the transmission of unnecessary light can be sufficiently cut off, and the image area can be ensured, so that it is possible to obtain the clear image in accordance with the display signal.

In this case, in the liquid crystal apparatus according to the second invention shown in FIG. 12, the polarization sheets are mounted on the lower surface of the lower glass substrate 101 and the upper surface of the upper glass substrate 111. Further, the same polarization sheets as above are provided on the upper surface of the upper glass substrate and the lower surface of the lower glass substrate according to another embodiment of the second invention.

Next, in the liquid crystal apparatus according to the embodiment of the second invention, as shown in FIGS. 11, 12(b) and 12(c), only the profile portion 104d of the light-cutting film 104 is projected outside the sealing member 105. Accordingly, in the outside of the sealing member 105, even if dust and waterdrops are attached between the leading portion of the signal electrode 103 consisting of the ITO film and the profile portion 104d of the light-cutting film consisting of the Cr film, so that the signal electrode 103 and the profile portion 104d are interconnected each other, the signal electrode 103 and the common electrode 102 are not short-circuited since the profile portion 104d is separated from the inner portion 104e of the light-cutting film by the separation slit 116, and, further, since it is separated from the common electrode 102 by the separation slit 117. Further, the signal electrode 103 and the inner side 104e of the light-cutting film are not connected. Accordingly, it is possible to eliminate problems in which the liquid crystal elements are not displayed or damaged due to dust at the outside of the sealing member 105. As a result, it is possible to resolve conventional problems.

In this embodiment, it is sufficient to set the allowable range for positioning of the separation slit 116 and the sealing member 105 to the range in which the separation slit 116 lies within the bonding area 104c of the sealing member 105. That is, in this range, it is possible to prevent a bad effect due to the above short-circuit, and it is possible to restrict the light transmission to the peripheral portions which are sufficiently apart from the liquid crystal elements 110 in the liquid crystal apparatus. In this embodiment, the minimum width of the allowable range can be expressed by the following formula.

1000 μm (target seal width)±200 μm (error of seal width)±50 μm (print error)=720 μm (minimum width)

As is obvious, it is possible to obtain the sufficiently allowable range in actual use.

Figure 13:
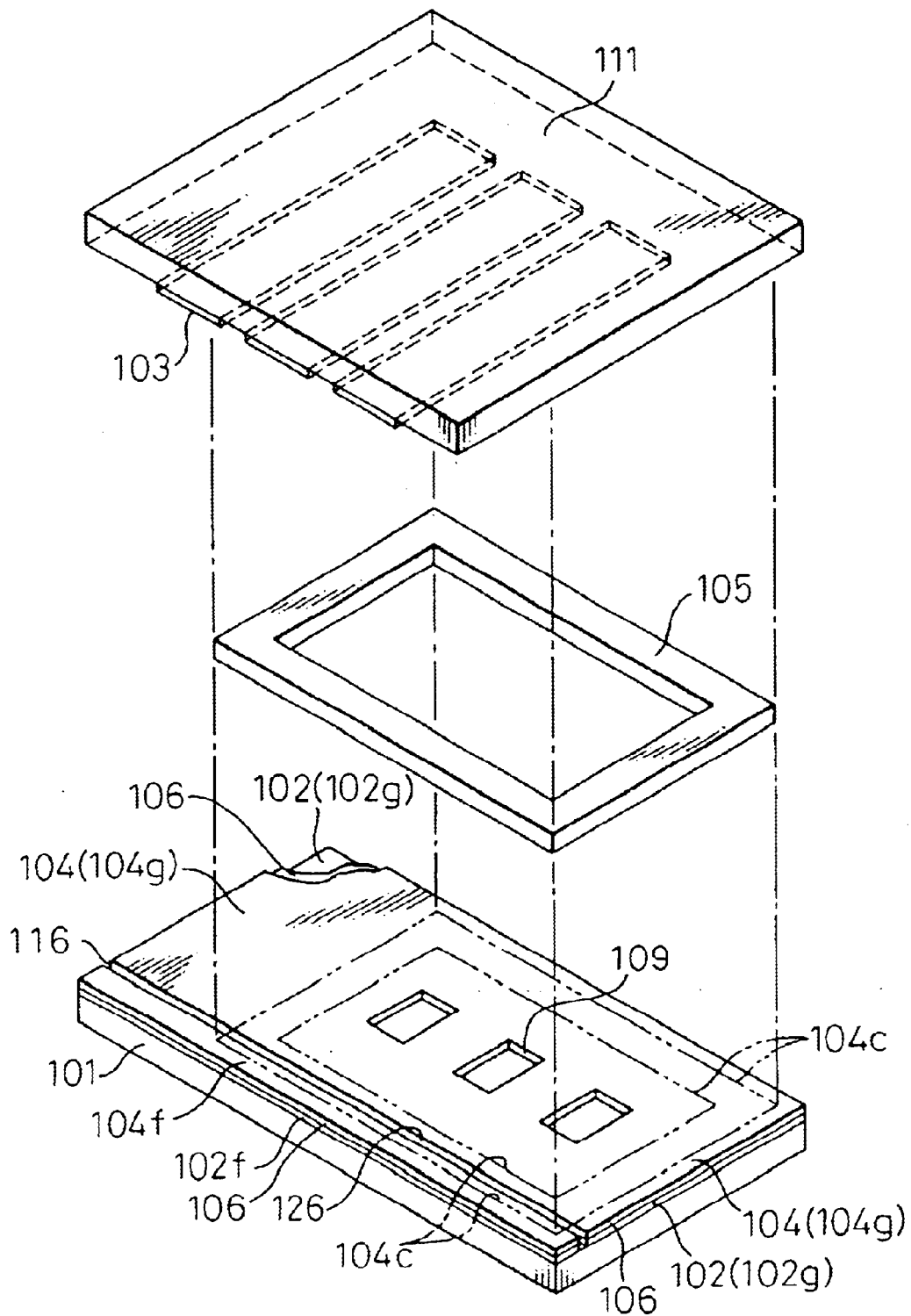
FIG. 13 is an exploded perspective view indicating the structure of the liquid crystal apparatus according to the second embodiment of the present invention.

Below, as one embodiment of the light-cutting film of the second invention being provided on the electrode film, a modified example of the liquid crystal apparatus shown in FIG. 11 will be explained with reference to the drawings. As shown in FIG. 13, the common electrode 102 consisting of the ITO film is formed on the whole of the upper surface on the lower glass substrate 101, the insulating film 106 is formed on the whole of the surface on the common electrode 102, and the light-cutting film 104 consisting of the Cr film is formed on the insulating film 106. The same window 109 as shown in FIG. 11 is provided on the light-cutting film 104. Along the end surface of this side on the lower glass substrate 101, the separation slit 116, which separates to two portions, i.e., the lower sides 102f and 104f and the main portions 102g and 104g, are arranged with the common electrode 102 and the light-cutting film 104, transmitting the bonding area 102c of the sealing member 105.

Using the upper glass substrate 111, the sealing member 105, and the lower glass substrate 101, these being shown in FIG. 13, the liquid crystal apparatus is formed as these parts are arranged so as to have the predetermined position relationship. In the liquid crystal apparatus according to this embodiment, the liquid crystal elements are formed based on the same principle as the liquid crystal shown in FIG. 11, and it is possible to ensure the image area and to obtain a clear image in accordance with the display signal. In this liquid crystal apparatus, the upper glass substrate 111 and a part of the signal electrode 103 of the lower surface thereof are projected to the outside of the sealing member 105. Further, in FIG. 13, only the lower side 102f of the common electrode separated on the lower glass substrate 101 and the lower side 104f separated from the light-cutting film are projected from the outside of the sealing member 105. Accordingly, in the outside of the sealing member 105, the signal electrode 103, the light-cutting film 104 (a part of 104f) and the common electrode 102 (a part of 102f) are close to each other in this side of the drawing.

Further, even if the signal electrode 103 is connected to the lower side 104f of the light-cutting film or the lower side 102 of the common electrode caused by dust, etc., the common electrode 102g consisting of the main ITO film and the light-cutting film 104g consisting of the Cr film are separated each other, and insulated electrically each other, so that the signal electrode 103 is not short-circuited to the common electrode 102 (a part of 102g). In this embodiment, when the width of the separation slit 116 is 30 μm or less, it is possible to reduce the influence of the leak of the light so as not to substantially fall the image quality, based on the same reasons as the case explained in FIG. 11. Accordingly, in this embodiment, it is possible to obtain the same effect as the liquid crystal apparatus shown in FIG. 11.

Below, the embodiment of the second invention will be explained with reference to the drawings. This embodiment relates to the liquid crystal apparatus in which the light-cutting film is provided to the transparent substrate having a plurality of common electrodes in a pair of the upper and lower transparent substrates. FIG. 14 shows the structure of lower glass substrate 101 as one example of the above liquid crystal apparatus, (a) is an upper view, (b) is an 14(b)—14(b) cross-sectional view of (a), and (c) is a 14(c)—14(c) cross-sectional view of (a). In this case, the structures of the upper glass substrate and the sealing member used in this embodiment are the same structures as the upper glass substrate 111 and the sealing member 105 shown in FIG. 11.

When comparing the lower glass substrate 101 in FIG. 14 with the lower glass substrate 101 in FIG. 22, these have the same structure each other except that the light-cutting film consisting of the Cr film has the separation slits 116 and 117. On the light-cutting film 104 formed on the lower glass substrate 101, the closed loop-like separation slit 116 is provided to a slightly inner portion from the bonding area 104c (an area surrounded by chain-dotted line) in which the light-cutting film 104 is superposed with the sealing member 105, so that the light-cutting film 104 is separated to the profile portion 104d and the inner portion 104e.

On the profile portion 104d of the light-cutting film 104, a plurality of separation slits 117 for dividing the profile portion 104d is arranged along a plurality of common electrodes 102. The separation slit 117 is the slit for coupling the separation slit 116, and is separated along a terminal electrode of each common electrode 102.

Using the same upper glass substrate 111 and sealing member 105 as shown in FIG. 13, and the lower glass substrate 101 shown in FIG. 14, the liquid crystal apparatus is formed is such a manner as these parts are arranged to the predetermined position relationship. FIG. 15 is a cross-sectional view of the liquid crystal apparatus shown in FIG. 14. In the liquid crystal apparatus shown in FIG. 15, the matrix-like liquid crystal elements 110 are formed based on the same liquid crystal apparatus as explained in FIG. 23, the wide areas of the peripheral portion of the pixels and the edges surrounding the peripheral portion are cut off by the light-cutting film 104 except for the separation slits 116 and 117.

For the area of the liquid crystal elements, the light can be transmitted through only the area superposed with the window 109 provided to the light-cutting film 104, and these areas become the substantial image areas. Since the separate slits 116 and 117 are arranged in a peripheral portion outside of the image area, and since the width of the separation slit becomes 30 μm, the bad influence to the image quality due to the unnecessary light transmitting through these areas can be negligible. Accordingly, in this example, the transmission of the unnecessary light can be sufficiently obstructed, and it is possible to obtain the clear matrix-like image based on the image signal.

Next, FIG. 15 is a cross-sectional view of the structure shown in FIG. 14. In FIG. 15, 112 is a spacer which consists of the glass and is provided on the sealing member 105. When bonding these parts with the sealing member 105, as explained in FIG. 23, the common electrode 102 consisting of the ITO film breaks through the insulating film 106 consisting of the resin film based on the pressure of the spacer 112 so that the common electrode 102 may contact with the light-cutting film 104 consisting of the Cr film. In this example, however, as the light-cutting film 104 is separated by the separation slit 116, the portion contacted by the common electrode 102 is limited to the profile portion 104d.

Figure 14C:
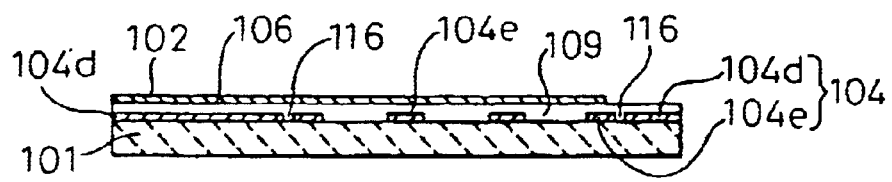
Figure 15:
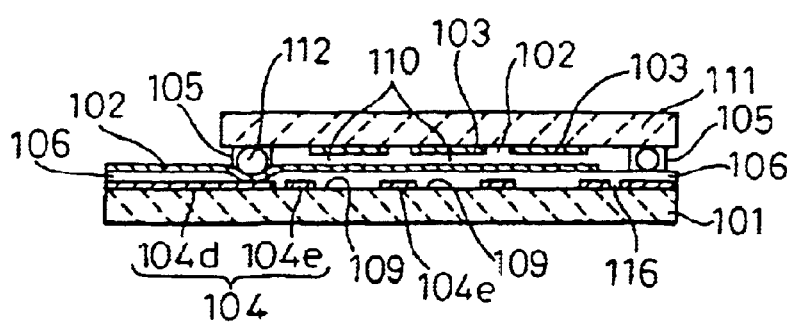
FIG. 15 is a cross-sectional view of the liquid crystal apparatus shown in FIG. 14.

Further, as shown in FIG. 14(c), since the profile portion 104d is divided corresponding to the common electrode 102, even if the common electrode 102 is contacted with the profile portion 104d due to the pressure of the spacer 112, a plurality of common electrodes 102 are not conducted with each other through the light-cutting film. Accordingly, as shown in FIG. 21 as the conventional art, it is possible to surely prevent erroneous drive of matrix pixels due to supply of the drive voltage to the common electrode which should be not selected in the matrix drive, so that it is possible to resolve the problems in the conventional art. In the present example, even if there is conduction between the signal electrode 103 and dust on the light-cutting film at the outside of the sealing member 105, since there is the insulating film 106, it is possible to prevent a short-circuit between the signal electrode and the common electrode so that it is possible to prevent unnecessary drive of the pixels.

Below, another embodiment according to the second invention will be explained with reference to the drawings, and a modified example of the liquid crystal apparatus shown in FIG. 15 will be explained below. FIG. 16 is a structural view of the lower glass substrate 101 according to the embodiment of the present invention, (a) is an upper view, (b) is an 16(b)—16(b) cross-sectional view of (a), and (c) is a 16(c)—16(c) cross-sectional view of (a). As shown in FIG. 16, the separation slit 116 is provided linearly on the light-cutting film 104 formed on the lower glass substrate 101, and elongated to the little shifted portion to the inside from the left side of the drawing in the bonding area 104c (i.e., the range surrounded by the chain-dotted line) in which the light-cutting film 104 is superposed with the sealing member 105. Further, the elongated separation slit 116 is so provided so as to reach the upper and lower surface of the light-cutting film 104 across the upper and lower side of the drawing of the bonding area 104c so that the light-cutting film can be separated to the left portion 104r and the right portion 104l. Another portion is the same structure as the lower glass substrate 101 shown in FIG. 14.

Using the same upper glass substrate 111 and sealing member 105 as shown in FIG. 13, and the lower glass substrate 101 shown in FIG. 16, the liquid crystal apparatus is formed in such a manner as these have a predetermined position relationship. In this liquid crystal apparatus, when bonding the sealing member 105, as well as the liquid crystal apparatus shown in FIG. 15, the common electrode 102 consisting of the ITO film breaks through the insulating film 106 consisting of the resin film so that the common electrode 102 may contact with the light-cutting film 104 consisting of the Cr film. In this case, however, the light-cutting film 104 is separated by the separation slit 116, and the contacting portion by the common electrode 102 is limited to the left portion 104l corresponding to the contacting portion 104d in FIG. 15.

Figure 16A:
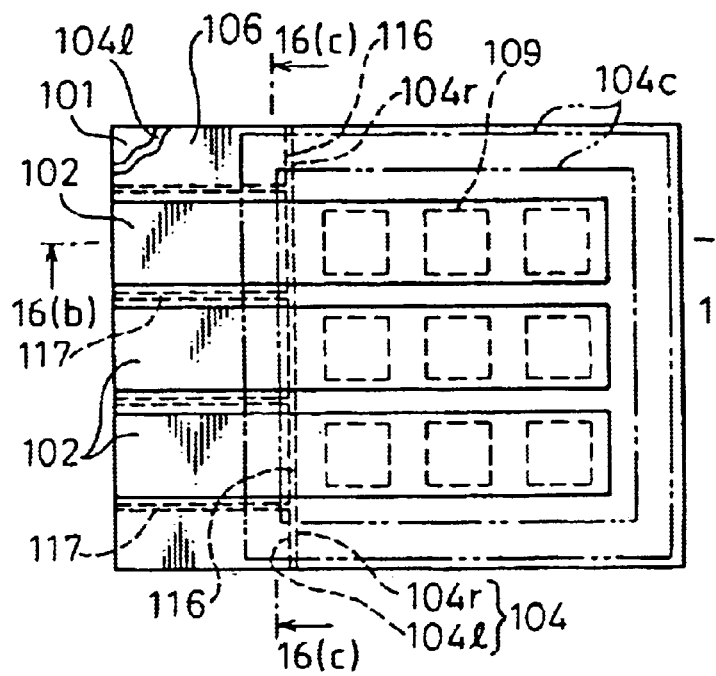
FIGS. 16(a), 16(b) and 16(c) show structures of an upper glass substrate 101 shown in FIG. 14.
Figure 16B:
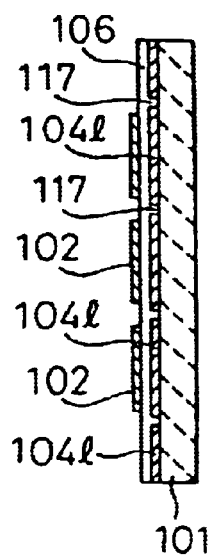
Figure 16C:
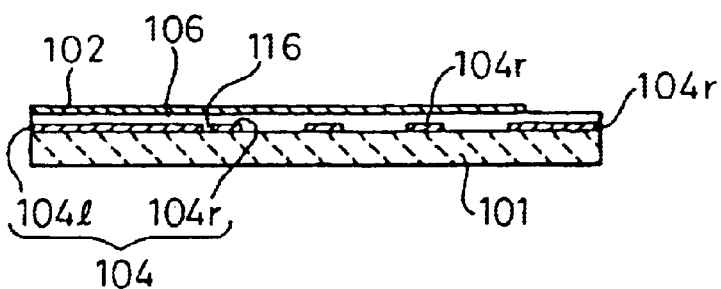

Further, as shown in FIGS. 16(a) and 16(b), since the left portion 104l is divided by the separation slit 117 corresponding to the common electrode 102, even if the common electrode 102 is connected to the left portion 104l, a plurality of common electrodes 102 are not connected each other through the light-cutting film 104. That is, in the liquid crystal apparatus according to this example, as well as the liquid crystal apparatus shown in FIG. 15, it is possible to surely prevent erroneous matrix image due to the short-circuit between the common electrodes. Further, based on the same reasons as the liquid crystal apparatus shown in FIG. 15, it is possible to sufficiently prevent the unnecessary transmission of the light and to obtain a clear image based on the image signal.

Figure 17:
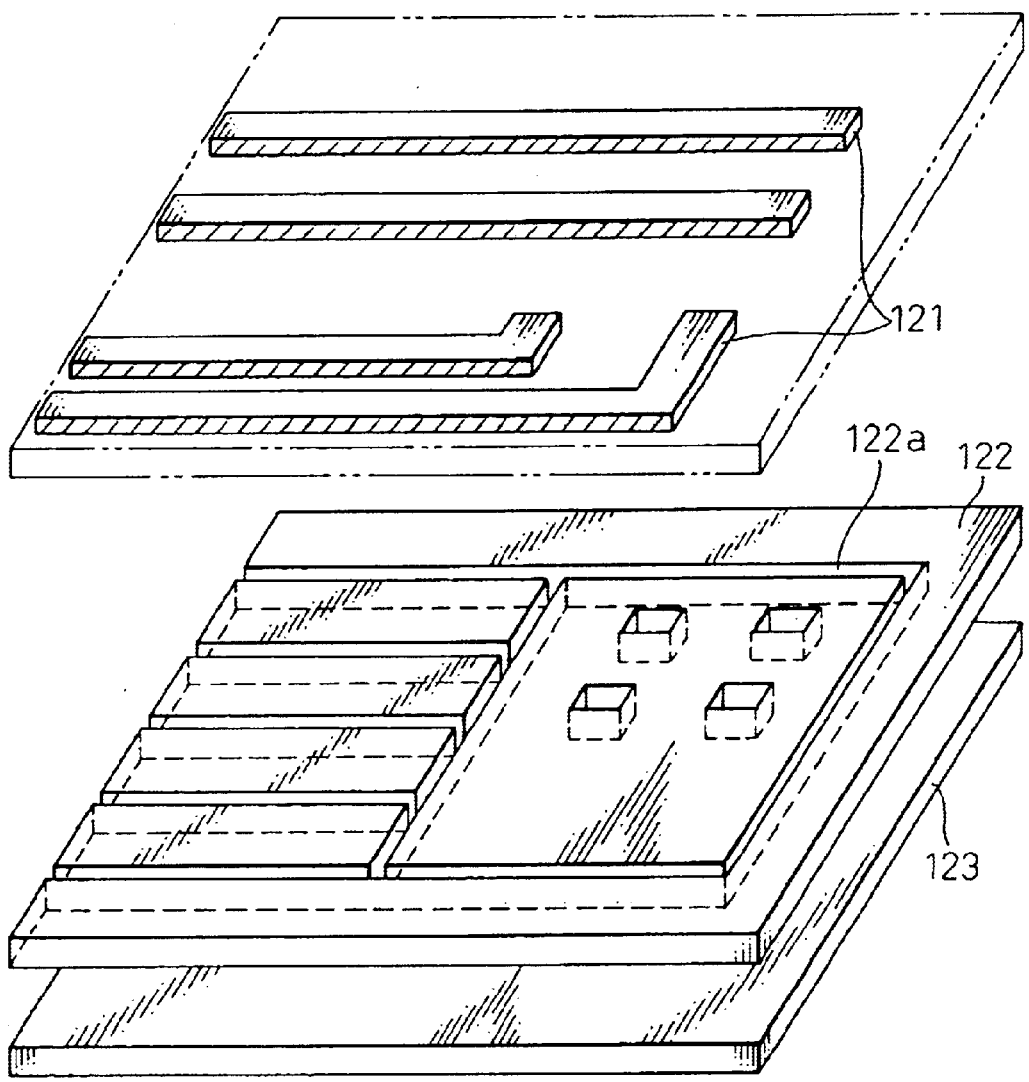
FIG. 17 is an essential enlarged perspective view for explaining separated slits according to the second embodiment of the present invention.

FIG. 17 is an essentially enlarged perspective view for explaining the separation slit according to the second invention. In FIG. 17, 121 is a drive electrode (40S), and 123 is a lower transparent substrate. 122 is a light-cutting black matrix, and a separation slit 122a is provided on the above light-cutting film as shown in the drawing.

Figure 18A:
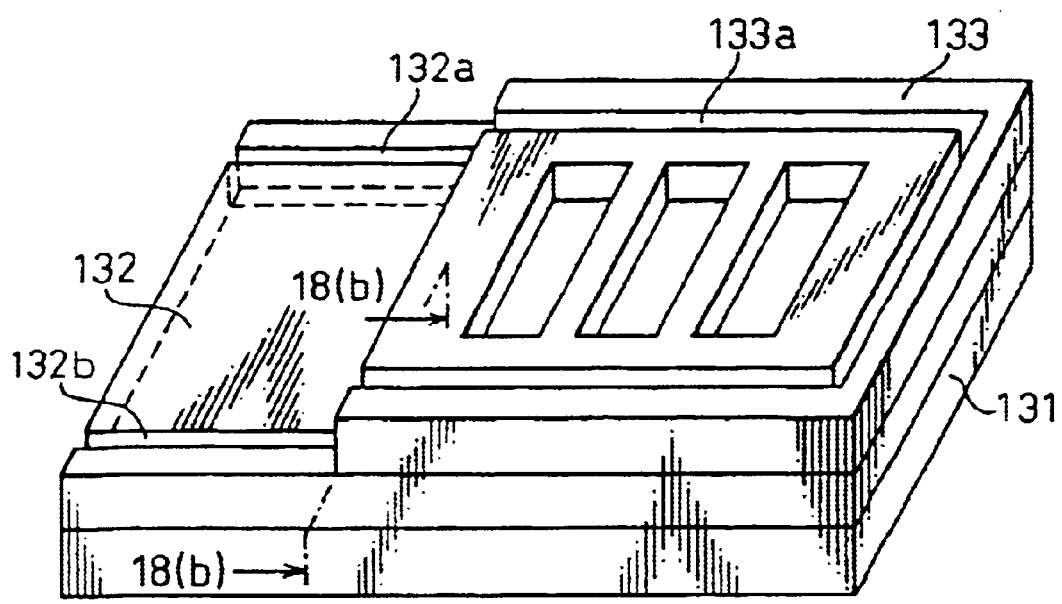
FIGS. 18(a) and 18(b) are essential structural views according to the second embodiment of the present invention.
Figure 18B:
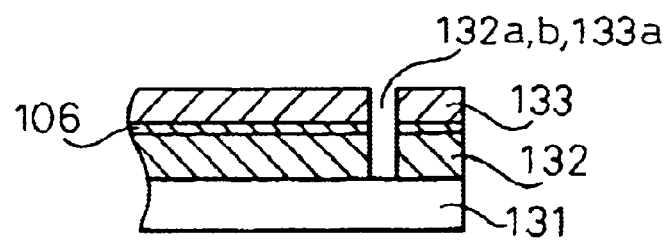

FIG. 18 is an essential structural view according to another example of the second invention. An electrode film 132 is provided on the lower transparent substrate 131, and a light-cutting black matrix 133 is provided on the electrode film 132. Further, the separation slits 132a and 132b are provided on the electrode film 132, and separation slit 133a is also provided on the light-cutting black matrix 133. The position relationship between the separation slits 132a and 132b and the separation slit 133a coincides with each other in the upper and lower direction.

Figure 24:
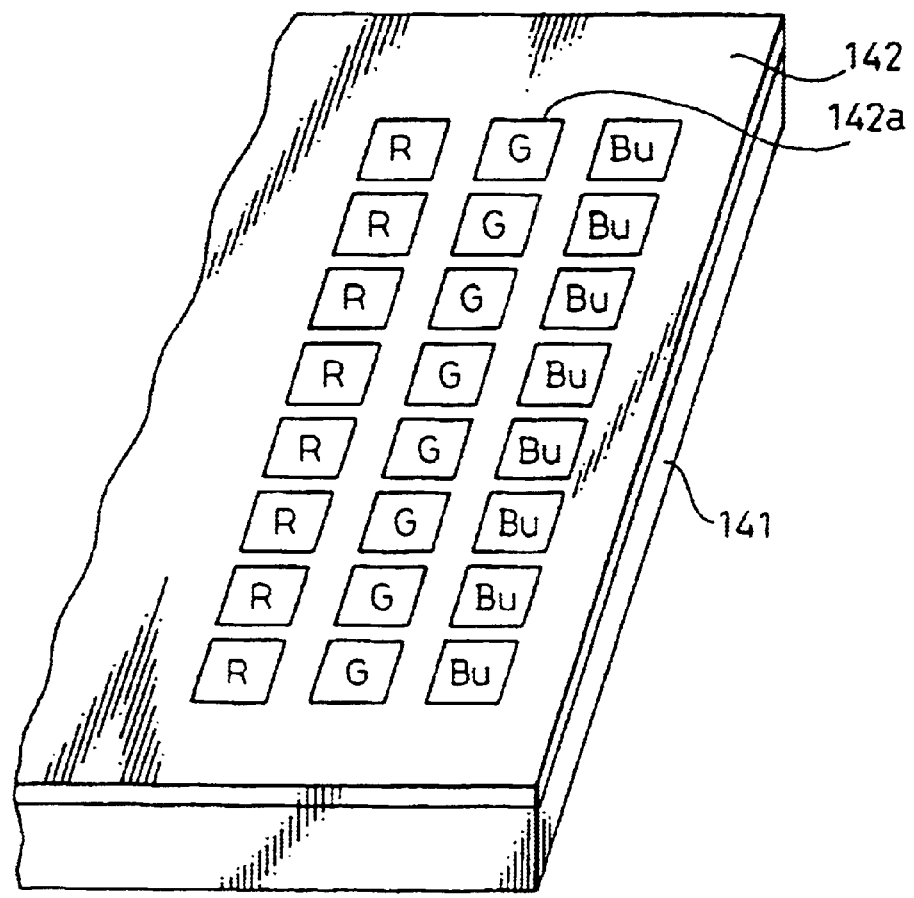
FIG. 24 is an essential outer view of the liquid crystal apparatus having a color filter for explaining application of the first and second embodiments to the liquid crystal apparatus having the color filter.

FIG. 24 is an essential outside view of the liquid crystal apparatus having color filters. The first and second inventions are applicable to the liquid crystal apparatus having the color filters. 141 is a lower transparent substrate, and 142 is a light-cutting black matrix. A plurality of filters, each consisting of red (R), green (G) or blue (Bu), are provided to each window 142a of the light-cutting film 142.

In the liquid crystal apparatus according to the above-mentioned second embodiment, although the explanations were given for the light-cutting film provided on the transparent substrate having the common electrode, it is possible to consider another case, for example, the light-cutting film provided on the transparent substrate having the signal electrode, or, the light-cutting film provided on the transparent substrate having the common electrode and the signal electrode. In the above cases, it is possible to realize the same effects as the case of the light-cutting film provided on the transparent substrate having the common electrode.

In the liquid crystal apparatus using the first and second inventions, each effect in these inventions is multiplied so that it is possible to improve yield rate, to reduce failures and to raise reliability, in the liquid crystal apparatus.

Possibility of Utilization in Industry

In the liquid crystal apparatus with leak current preventing function according to the present invention, in the first invention, a plurality of slits are provided on the dummy electrode which is provided to uniform the gap between the upper and lower transparent substrates for holding the liquid crystal layer, so that the leak current can be prevented. In the second invention, a plurality of slits are provided on the light-cutting film, which is provided to cut off the unnecessary light at the image forming area on the transparent substrate, so that the leak current can be prevented. These inventions are effectively applicable to various products using the liquid crystal apparatus, for example, a liquid crystal television receiver, a liquid crystal monitor, a liquid crystal projector, a liquid crystal printer, etc., so that the possibility of utilization in industry is very large.

What is claimed is:

1. A liquid crystal apparatus with leak current preventing function, comprising:
    first and second transparent substrates opposite to each other;
    first and second transparent imaging electrodes, each formed on an opposite inner surface of the first and second transparent substrates;
    a sealing member between the first and second transparent substrates for providing a liquid crystal injecting area, for forming a gap, and for sealing the liquid crystal in the gap; and
    a conductive light-cutting film on at least one of the first and second transparent substrates for cutting off unnecessary light at an image area and peripheral portion thereof;
    wherein separation slits for dividing the light-cutting film into a plurality of portions are provided in a peripheral area outside of the image area, so as to surround said image area, said separation slits surrounding said image area, and in which the light-cutting film is superposed with the sealing member.

2. A liquid crystal apparatus with leak current preventing function as claimed in claim 1, wherein the width of the separation slit is three tenths ($3/10$) or less of the width of a wall of the sealing member.

3. A liquid crystal apparatus according to claim 2, wherein said island portions of said dummy electrode are defined by a slit forming a space and made by removing a part of electrode material of said dummy electrode.

4. A liquid crystal apparatus with leak current preventing function, comprising:
    first and second transparent substrates provided opposite to each other;
    first and second transparent imaging electrodes, each formed on an opposite inner surface of the first and second transparent substrates;
    a sealing member between the first and second transparent substrates for providing a liquid crystal injecting area, for forming a gap, and for sealing the liquid crystal in the gap; and
    a conductive light-cutting film on at least one of the first and second transparent substrates for cutting off unnecessary light at an image area and peripheral portion thereof;
    wherein separation slits for dividing the light-cutting film and the transparent electrodes for image into a plurality of portions are provided in a peripheral area outside of the image area, the light-cutting film being superposed by the first and second transparent imaging electrodes and with the sealing member in the peripheral area.

5. A liquid crystal apparatus with leak current preventing function as claimed in claim 4, wherein the width of the separation slit is three tenths ($3/10$) or less of the width of a wall of the sealing member.

6. A liquid crystal apparatus with leak current preventing function as claimed in claim 4, wherein, a separation slit is provided to the light-cutting film for further dividing a part of the light-cutting film separated along the first and second transparent electrodes.

7. A liquid crystal apparatus with leak current preventing function, comprising:
    first and second transparent substrates provided opposite to each other;
    first and second transparent imaging electrodes, each formed on an opposite inner surface of the first and second transparent substrates;
    a sealing member between the first and second transparent substrates for providing a liquid crystal injecting area, for forming a gap, and for sealing the liquid crystal in the gap; and
    a conductive light-cutting film associated with at least one of the first and second transparent substrates for cutting off unnecessary light at an image area having a plurality of transparent electrodes;
    wherein an insulating film is layered with the light-cutting film and at least one of the first and second transparent electrodes is further provided on a surface of the insulating film, the light-cutting film has a separation slit for dividing the light-cutting film into a plurality of portions at a position slightly inward from the sealing member, and a further separation slit is provided in the light-cutting film for further dividing a part of the divided light-cutting film.

8. A liquid crystal apparatus with leak current preventing function as claimed in claim 7, wherein the width of the separation slit is three tenths ($3/10$) or less of the width of a wall of the sealing member.

9. A liquid crystal apparatus with a leak current preventing function as claimed in claim 7, wherein the one of the first and second transparent electrodes are further provided on a top surface of the insulating film.

10. A liquid crystal apparatus with a leak current preventing function as claimed in claim 7, wherein the one of the first and second transparent electrodes are further provided on a bottom surface of the insulating film.

11. A liquid crystal apparatus with leak current preventing function, comprising:
    first and second transparent substrates provided opposite to each other;
    first and second imaging electrodes, each formed on an opposite inner surface of the first and second transparent substrates;
    a sealing member between the first and second transparent substrates for providing a liquid crystal injecting area, for forming a gap, and for sealing the liquid crystal in the gap; and
    a plurality of conductive particles included dispersedly within the sealing member;
    a drive lead electrode formed at a position covered by the sealing member;
    a dummy electrode formed opposite to at least a part of the drive lead electrode, at the position in which the first and second transparent substrates are covered by the sealing member; and
    a conductive light-cutting film on at least one of the first and second transparent substrates for cutting off unnecessary light at an image area and peripheral portion thereof;
    wherein the dummy electrode is divided by a plurality of slits, and further, a separation slit for dividing the light-cutting film into a plurality of portions is provided in a peripheral area outside of the image area and in which the light-cutting film is superposed with the sealing member.

12. A liquid crystal apparatus with leak current preventing function as claimed in claim 11, wherein the width of the separation slit is three tenths (3/10) or less of the width of a wall of the sealing member.

13. A liquid crystal apparatus with leak current preventing function, comprising:
   first and second transparent substrates provided opposite to each other;
   first and second imaging electrodes, each formed on an opposite inner surface of the first and second transparent substrates;
   a sealing member between the first and second transparent substrates for providing a liquid crystal injecting area, for forming a gap, and for sealing the liquid crystal in the gap;
   a plurality of conductive particles included dispersedly within the sealing member;
   a drive electrode formed at the position covered by the sealing member of the first and second imaging electrodes;
   a dummy electrode formed opposite to at least a part of the drive electrode, at the position in which the first and second transparent substrates are covered by the sealing member; and
   a conductive light-cutting film provided to at least one of the first and second transparent substrates for cutting off unnecessary light at an image area having a plurality of transparent electrodes and peripheral portion of the image area;
   wherein the dummy electrode is divided by a plurality of slits, the light-cutting film and the first and second imaging electrodes are superposed, and a separation slit is provided for dividing the superposed light-cutting film and the imaging electrodes into a plurality of portions.

14. A liquid crystal apparatus with leak current preventing function as claimed in claim 13, wherein the width of the separation slit is three tenths (3/10) or less of the width of a wall of the sealing member.

15. A liquid crystal apparatus with leak current preventing function, comprising:
   first and second transparent substrates provided opposite to each other;
   first and second imaging electrodes, each formed on an opposite inner surface of the first and second transparent substrates;
   a sealing member between the first and second transparent substrates for providing a liquid crystal injecting area, for forming a gap, and for sealing the liquid crystal in the gap; and
   a plurality of conductive particles included dispersedly within the sealing member;
   a drive electrode formed at the position covered by the sealing member of the first and second imaging electrodes;
   a dummy electrode formed opposite to the drive electrode, at the position in which the first and second transparent substrates are covered by the sealing member; and
   a conductive light-cutting film on at least one of the first and second transparent substrates for cutting off unnecessary light at the plurality of imaging electrodes, an image area, and peripheral portion of the image area;
   wherein the dummy electrode is divided by a plurality of slits, the light-cutting film and the plurality of imaging electrodes are superposed with an insulating film, the plurality of imaging electrodes are insulated from each other, the light-cutting film has a separation slit for dividing the light-cutting film into a plurality of portions at a position inward of the sealing member, and a further separation slit is provided in the light-cutting film for dividing a part of the divided light-cutting film.

16. A liquid crystal apparatus with leak current preventing function as claimed in claim 15, wherein the width of the separation slit is three tenth (3/10) or less of the width of a wall of the sealing member.

17. A liquid crystal apparatus with leak current preventing function as claimed in claim 11, 13 or 15, wherein a width of each slit for dividing the dummy electrode is set to a value larger than a diameter of each of the conductive particles.

18. A liquid crystal apparatus with leak current preventing function as claimed in claim 11, 13 or 15, wherein the dummy electrode is provided in parallel to and along a side of the sealing member.

19. A liquid crystal apparatus comprising:
   first and second transparent substrates provided opposite to each other via a liquid crystal;
   a plurality of driving electrodes for driving the liquid crystal formed on at least one of opposite inner surfaces of said first and second transparent substrates to apply a voltage to said liquid crystal;
   a dummy electrode formed opposite to one of said driving electrodes on the other of said opposite inner surfaces at a position covered by a sealing member, said dummy electrode applying no voltage to said liquid crystal;
   wherein said one of said driving electrodes and said dummy electrode are opposed to each other through an insulating film so as to electrically insulate said one of said driving electrodes from said dummy electrode, and said dummy electrode comprises a plurality of island portions electrically insulated from each other and at least two of said plurality of island portions are provided oppositely to said one of said driving electrodes.

20. A liquid crystal apparatus according to claim 19, wherein said dummy electrode has an elongated shape and said island portions of said dummy electrode are positioned along said elongated shape in a direction of shape elongation.

21. A liquid crystal apparatus with leak current preventing function, comprising:
   first and second transparent substrates opposite to each other, said first and second transparent substrates being formed of an insulating material;
   first and second transparent imaging electrodes, each formed on an opposite inner surface of the first and second transparent substrates;
   a sealing member between the first and second transparent substrates for providing a liquid crystal injecting area, for forming a gap, and for sealing the liquid crystal in the gap; and
   a conductive light-cutting film, formed on at least one inner surface of said first and second transparent substrates or on a common insulating member, for cutting off unnecessary light at an image area and peripheral portion thereof;
   wherein separation slits for dividing the light-cutting film into a plurality of portions are provided in a peripheral area outside of the image area, said separation slits surrounding said image area, and in which the light cutting film is superposed with the sealing member.

* * * * *